(12) United States Patent
Park et al.

(10) Patent No.: US 12,354,806 B2
(45) Date of Patent: Jul. 8, 2025

(54) MULTILAYER ELECTRONIC COMPONENT

(71) Applicant: SAMSUNG ELECTRO-MECHANICS CO., LTD., Suwon-si (KR)

(72) Inventors: Jeong Bong Park, Suwon-si (KR); Han Bok Lee, Suwon-si (KR); Da Jeong Han, Suwon-si (KR); Hye Soo Chung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 261 days.

(21) Appl. No.: 17/959,576

(22) Filed: Oct. 4, 2022

(65) Prior Publication Data
US 2023/0113834 A1    Apr. 13, 2023

(30) Foreign Application Priority Data

Oct. 7, 2021  (KR) .................. 10-2021-0133382
Sep. 26, 2022 (KR) .................. 10-2022-0121815

(51) Int. Cl.
*H01G 4/30*  (2006.01)
*H01G 2/06*  (2006.01)
(Continued)

(52) U.S. Cl.
CPC .............. *H01G 4/30* (2013.01); *H01G 2/065* (2013.01); *H01G 4/008* (2013.01); *H01G 4/012* (2013.01);
(Continued)

(58) Field of Classification Search
CPC .......... H01G 4/30; H01G 2/065; H01G 4/008; H01G 4/012; H01G 4/12; H01G 4/224; H01G 4/2325
See application file for complete search history.

(56) References Cited

U.S. PATENT DOCUMENTS

| 10,361,035 B1* | 7/2019 | Song ................ H01G 4/1227 |
| 2015/0043125 A1* | 2/2015 | Park ................ H01G 4/30 |
| | | 156/89.12 |

(Continued)

FOREIGN PATENT DOCUMENTS

| KR | 10-2016-0112972 A | 9/2016 |
| KR | 10-2018-0035170 A | 4/2018 |
| KR | 10-2019-0125876 A | 11/2019 |

*Primary Examiner* — Michael P McFadden
(74) *Attorney, Agent, or Firm* — Morgan, Lewis & Bockius LLP

(57) ABSTRACT

A multilayer electronic component includes: a body including a dielectric layer, first and second internal electrodes, alternately disposed with the dielectric layer disposed therebetween, first and second surfaces opposing each other in a first direction, third and fourth surfaces connected to the first and second surfaces and opposing each other in a second direction, and fifth and sixth surfaces connected to the first to fourth surfaces and opposing each other in a third direction; a first base electrode layer disposed on the third surface and including a first connection portion connected to the first internal electrode; a second base electrode layer disposed on the fourth surface and including a second connection portion connected to the second internal electrode; a first electrode layer disposed on a region including the third surface, the first surface, and the second surface, and formed to expose at least a portion of the first base electrode layer; and a second electrode layer disposed on a region including the fourth surface, the first surface, and the second surface and formed to expose at least a portion of the second base electrode layer, wherein the first and second base electrode layers include Cu, and the first and second electrode layers include Ag.

46 Claims, 21 Drawing Sheets

(51) Int. Cl.
*H01G 4/008* (2006.01)
*H01G 4/012* (2006.01)
*H01G 4/12* (2006.01)
*H01G 4/224* (2006.01)
*H01G 4/232* (2006.01)

(52) U.S. Cl.
CPC ............... *H01G 4/12* (2013.01); *H01G 4/224* (2013.01); *H01G 4/2325* (2013.01)

(56) References Cited

U.S. PATENT DOCUMENTS

| | | | |
|---|---|---|---|
| 2015/0084481 A1* | 3/2015 | Mori | H01G 4/252 |
| | | | 29/829 |
| 2015/0084487 A1* | 3/2015 | Mori | H01G 4/248 |
| | | | 336/200 |
| 2015/0223340 A1* | 8/2015 | Jung | H01G 4/008 |
| | | | 156/89.12 |
| 2016/0276106 A1 | 9/2016 | Kuroiwa et al. | |
| 2016/0351332 A1* | 12/2016 | Lee | H01G 4/232 |
| 2018/0090274 A1 | 3/2018 | Ito et al. | |
| 2018/0174753 A1* | 6/2018 | Terashita | H01G 4/008 |
| 2018/0374639 A1* | 12/2018 | Akiyoshi | H01G 4/12 |
| 2019/0131076 A1* | 5/2019 | Fukumura | H01G 4/232 |
| 2019/0333699 A1 | 10/2019 | Lee et al. | |
| 2019/0385795 A1* | 12/2019 | Yang | H01G 4/30 |
| 2020/0234887 A1* | 7/2020 | Muramatsu | H01G 4/1218 |
| 2023/0019604 A1* | 1/2023 | Uchida | H01G 4/30 |

\* cited by examiner

MULTILAYER ELECTRONIC COMPONENT

CROSS-REFERENCE TO RELATED APPLICATION(S)

This application claims benefit of priority to Korean Patent Application No. 10-2021-0133382 filed on Oct. 7, 2021 and 10-2022-0121815 filed on Sep. 26, 2022 in the Korean Intellectual Property Office, the disclosure of which is incorporated herein by reference in its entirety.

TECHNICAL FIELD

The present inventive concept relates to a multilayer electronic component.

BACKGROUND

A multilayer ceramic capacitor (MLCC) as one of multilayer electronic components is an important chip component used in industries such as communications, computers, home appliances, and automobiles due to their small size and high capacity, and in particular, is a key passive element used in various electrical, electronic and information communication devices such as mobile phones, computers, and digital TVs. In addition, as multilayer ceramic capacitors are used in automobiles or infotainment systems, demands for high reliability, high strength characteristics, and miniaturization are increasing.

Conventionally, in order to mount the general multilayer ceramic capacitor on a substrate or the like, an external electrode of the multilayer ceramic capacitor may include a plating layer formed on an electrode layer. However, when such a multilayer ceramic capacitor is mounted on a substrate in a high-temperature and high-vibration environment, a difference in thermal expansion coefficients between tin (Sn) solder, an external electrode, and a substrate may cause a problem of forming solder cracks, and oxidation due to high temperature may cause a problem of increasing contact resistance.

To solve this problem, an external electrode structure including a base electrode layer including copper (Cu) and an electrode layer including silver (Ag) has been used. When such an external electrode is used, a multilayer ceramic capacitor may be mounted on a substrate by using conductive glue such as silver epoxy instead of tin soldering, and thus, has superior reliability in high temperature, high pressure, and high vibration environments compared to the general multilayer ceramic capacitors mounted on the substrate by the tin (Sn) soldering.

However, when the external electrode including Ag is exposed to moisture while a voltage is formed, Ag ion migration may occur along a surface of a multilayer ceramic capacitor. Such Ag ion migration causes leakage current on the surface of the multilayer ceramic capacitor, which is a factor of causing a deterioration in insulation resistance or a short circuit defect of the multilayer ceramic capacitor.

Therefore, even when the external electrode includes Ag, there is a need to improve the structure of the external electrode capable of effectively suppressing the Ag ion migration to suppress the deterioration in insulation resistance and the short circuit defect of the multilayer ceramic capacitor.

SUMMARY

An aspect of the present disclosure may solve a problem of causing a deterioration in insulation resistance or a short circuit defect of a multilayer electronic component due to Ag ion migration occurring when an external electrode includes Ag.

An aspect of the present disclosure may solve a problem of lowering moisture resistance reliability of a multilayer electronic component because a base electrode layer including Cu is exposed to the outside when controlling a disposition region of an electrode layer including Ag to solve the problem of Ag ion migration.

However, the objects in the present disclosure are not limited to the above description, and may be more easily understood in the course of describing the specific example embodiments in the present disclosure.

According to an aspect of the present disclosure, a multilayer electronic component may include: a body including a dielectric layer, first and second internal electrodes, alternately disposed with the dielectric layer disposed therebetween, first and second surfaces opposing each other in a first direction, third and fourth surfaces connected to the first and second surfaces and opposing each other in a second direction, and fifth and sixth surfaces connected to the first to fourth surfaces and opposing each other in a third direction; a first base electrode layer disposed on the third surface and including a first connection portion connected to the first internal electrode; a second base electrode layer disposed on the fourth surface and including a second connection portion connected to the second internal electrode; a first electrode layer disposed on a region including the third surface, the first surface, and the second surface, and formed to expose at least a portion of the first base electrode layer; and a second electrode layer disposed on a region including the fourth surface, the first surface, and the second surface and formed to expose at least a portion of the second base electrode layer, wherein the first and second base electrode layers include Cu, and the first and second electrode layers include Ag.

According to an another aspect of the present disclosure, a multilayer electronic component may include: a body including a dielectric layer, first and second internal electrodes, alternately disposed with the dielectric layer disposed therebetween, first and second surfaces opposing each other in a first direction, third and fourth surfaces connected to the first and second surfaces and opposing each other in a second direction, and fifth and sixth surfaces connected to the first to fourth surfaces and opposing each other in a third direction; a first base electrode layer including a first connection portion disposed on the third surface and connected to the first internal electrode, a first band portion extending from the first connection portion to a portion of the first surface, and a third band portion extending from the first connection portion to a portion of the second surface; a second base electrode layer including a second connection portion disposed on the fourth surface and connected to the second internal electrode, a second band portion extending from the second connection portion to a portion of the first surface, and a fourth band portion extending from the second connection portion to a portion of the second surface; a first electrode layer disposed on the first band portion; and a second electrode layer disposed on the second band portion, in which the first and second base electrode layers include Cu, and the first and second electrode layers may include Ag.

According to another aspect of the present disclosure, a multilayer electronic component may include: a body including a dielectric layer, first and second internal electrodes, alternately disposed with the dielectric layer disposed therebetween, first and second surfaces opposing each other in a first direction, third and fourth surfaces connected to the first and second surfaces and opposing each other in a second direction, and fifth and sixth surfaces connected to the first to fourth surfaces and opposing each other in a third direction; a first connection electrode disposed on the third surface; a second connection electrode disposed on the fourth surface; a first band electrode disposed on the first surface and connected to the first connection electrode; and a second band electrode disposed on the first surface and connected to the second connection electrode, in which the first and second connection electrodes may include Cu, and the first and second band electrodes may include Ag.

According to another aspect of the present disclosure, a multilayer electronic component may include: a body including a dielectric layer, first and second internal electrodes, alternately disposed with the dielectric layer disposed therebetween, first and second surfaces opposing each other in a first direction, third and fourth surfaces connected to the first and second surfaces and opposing each other in a second direction, and fifth and sixth surfaces connected to the first to fourth surfaces and opposing each other in a third direction; a first base electrode layer including a first connection portion disposed on the third surface and connected to the first internal electrode, a first band portion extending from the first connection portion to a portion of the first surface, and a third band portion extending from the first connection portion to a portion of the second surface; a second base electrode layer including a second connection portion disposed on the fourth surface and connected to the second internal electrode, a first band portion extending from the second connection portion to a portion of the first surface, and a fourth band portion extending from the second connection portion to a portion of the second surface; a first electrode layer disposed on the first connection portion; a second electrode layer disposed on the second connection portion; a first metal frame disposed on the first electrode layer; a second metal frame disposed on the second electrode layer; and conductive connection portions respectively disposed between the first electrode layer and the first metal frame and between the second electrode layer and the second metal frame, in which the first and second base electrode layers may include Cu, and the first and second electrode layers may include Ag.

According to another aspect of the present disclosure, a multilayer electronic component may include: a body including a dielectric layer and first and second internal electrodes with the dielectric layer therebetween; a first base electrode layer disposed on the body and connected to the first internal electrode; a second base electrode layer disposed on the body and connected to the second internal electrode; a first electrode layer connected to the first base electrode layer and covering only a portion of the first base electrode layer; and a second electrode layer connected to the second base electrode layer and covering only a portion of the second base electrode layer. The first and second base electrode layers may include Cu, and the first and second electrode layers may include Ag.

According to another aspect of the present disclosure, a multilayer electronic component may include: a body including a dielectric layer and first and second internal electrodes with the dielectric layer therebetween; a first base electrode layer disposed on the body and connected to the first internal electrode; a second base electrode layer disposed on the body and connected to the second internal electrode; a first electrode layer connected to the first base electrode layer and covering only a portion of the first base electrode layer; and a second electrode layer connected to the second base electrode layer and covering only a portion of the second base electrode layer. A main metal of the first and second electrode layers may have a standard reduction potential greater than that of a main metal of the first and second base electrode layers.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
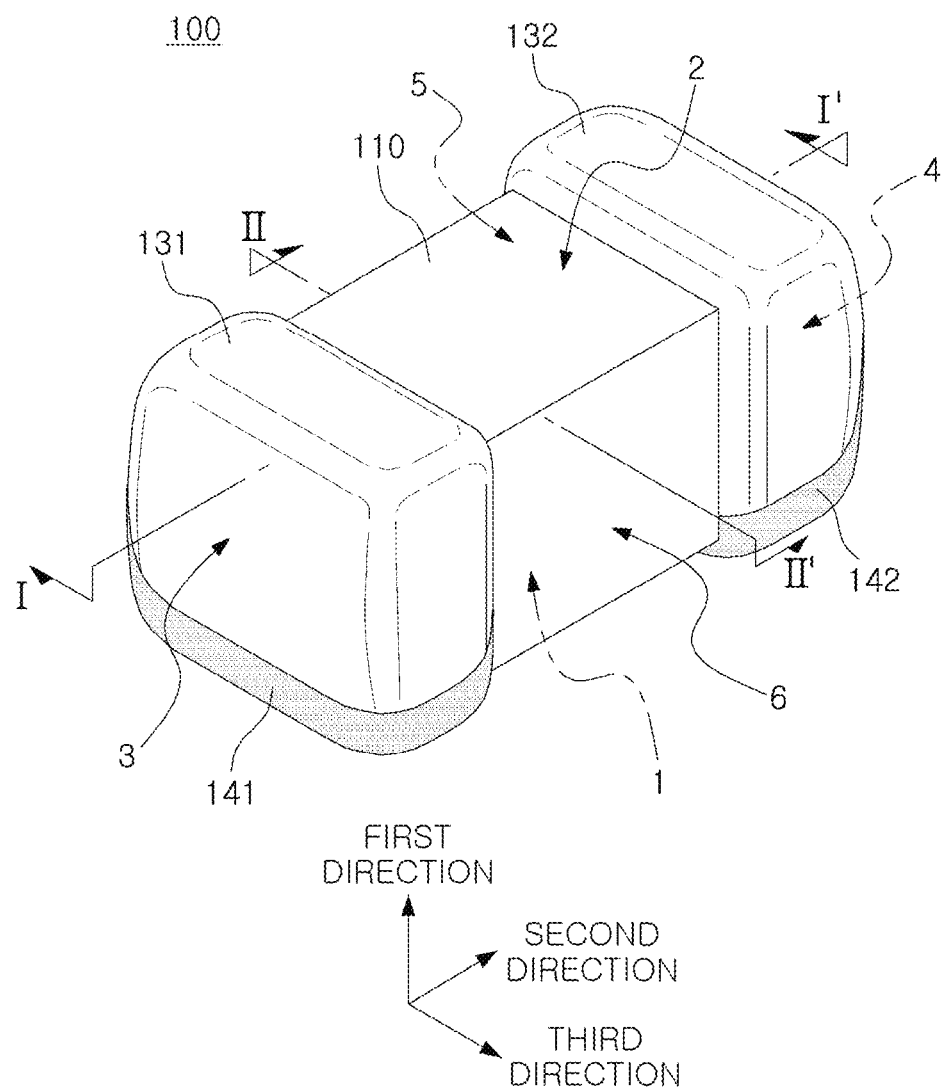
FIG. 1 is a perspective view illustrating a multilayer electronic component according to an example embodiment in the present disclosure.

Hereinafter, example embodiments will be described in detail with reference to the accompanying drawings. However, example embodiments may be modified in various other forms, and the scope of the present disclosure is not limited to example embodiments to be described below. Further, example embodiments are provided in order to more completely explain the present disclosure to those skilled in the art. In the drawings, the shapes and dimensions may be exaggerated for clarity, and the same reference numerals will be used throughout to designate the same or like components.

In order to clearly explain the present disclosure, parts irrelevant to the description will be omitted in the drawings, and sizes and thicknesses of each component illustrated in the drawings are arbitrarily indicated for convenience of description, and therefore, the present disclosure is not necessarily limited to those illustrated. Further, like reference numerals will be used to designate like components having similar functions throughout the drawings within the scope of the present disclosure. Furthermore, throughout the present specification, unless explicitly described to the contrary, "comprising" any components will be understood to imply the inclusion of other elements rather than the exclusion of any other elements.

In the drawings, a first direction may be defined as a thickness (T) direction, a second direction may be defined as a length (L) direction, and a third direction may be defined as a width (W) direction.

FIG. 1 is a perspective view illustrating a multilayer electronic component 100 according to an example embodiment in the present disclosure.

Figure 2:
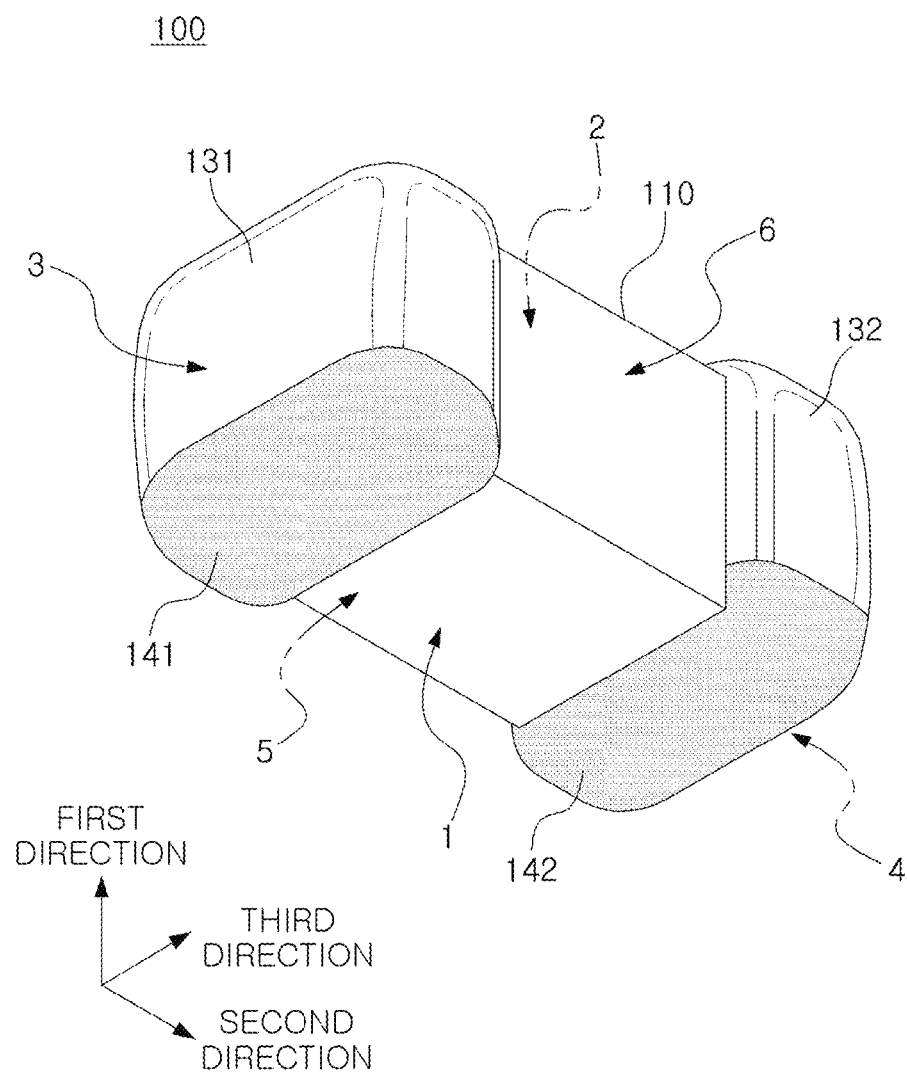
FIG. 2 is a bottom perspective view of the multilayer electronic component according to FIG. 1.

FIG. 2 is a bottom perspective view of the multilayer electronic component according to FIG. 1.

Figure 3:
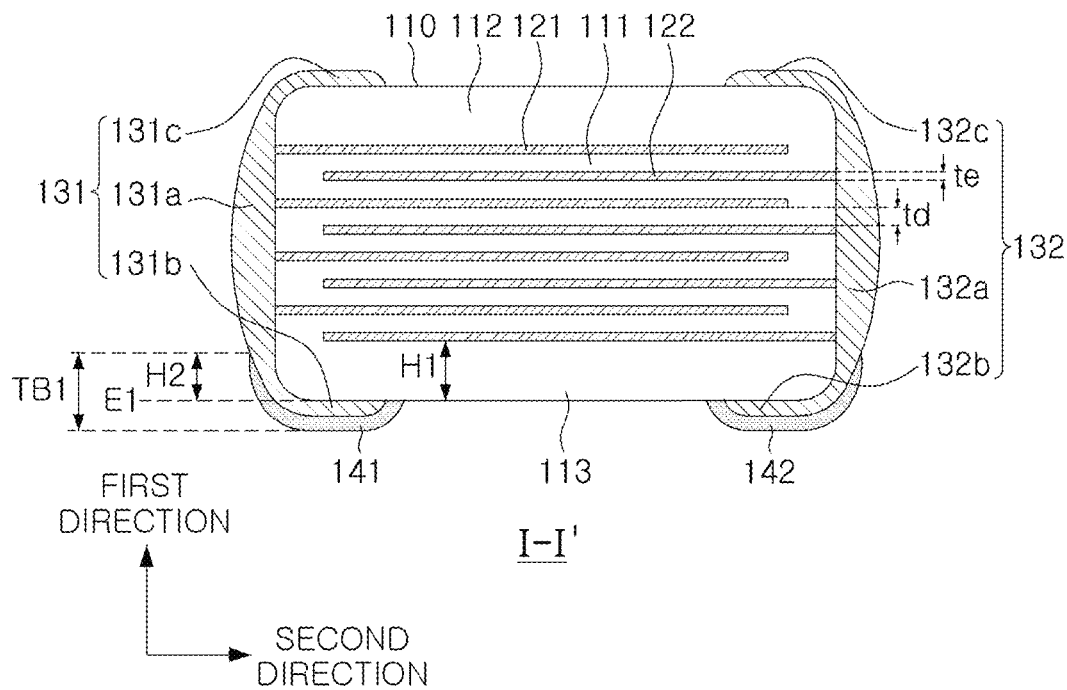
FIG. 3 is a cross-sectional view taken along line I-I' of FIG. 1.

FIG. 3 is a cross-sectional view taken along line I-I' of FIG. 1.

Figure 4:
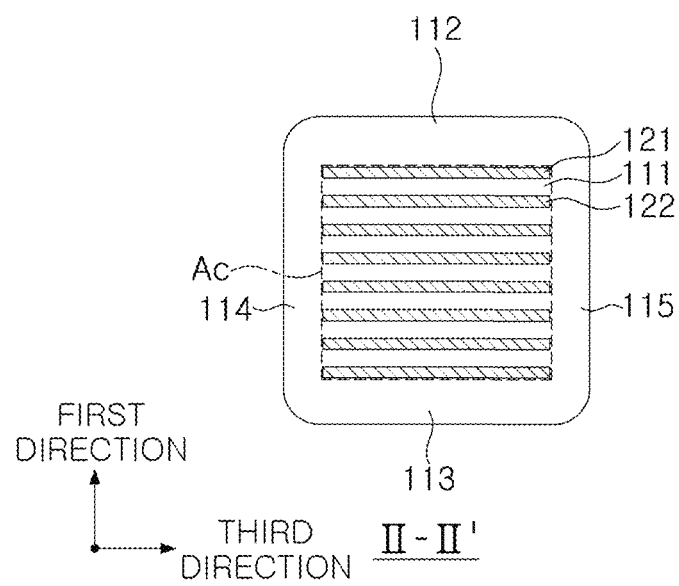
FIG. 4 is a cross-sectional view taken along line II-II' of FIG. 1.

FIG. 4 is a cross-sectional view taken along line II-II' of FIG. 1.

Figure 5:
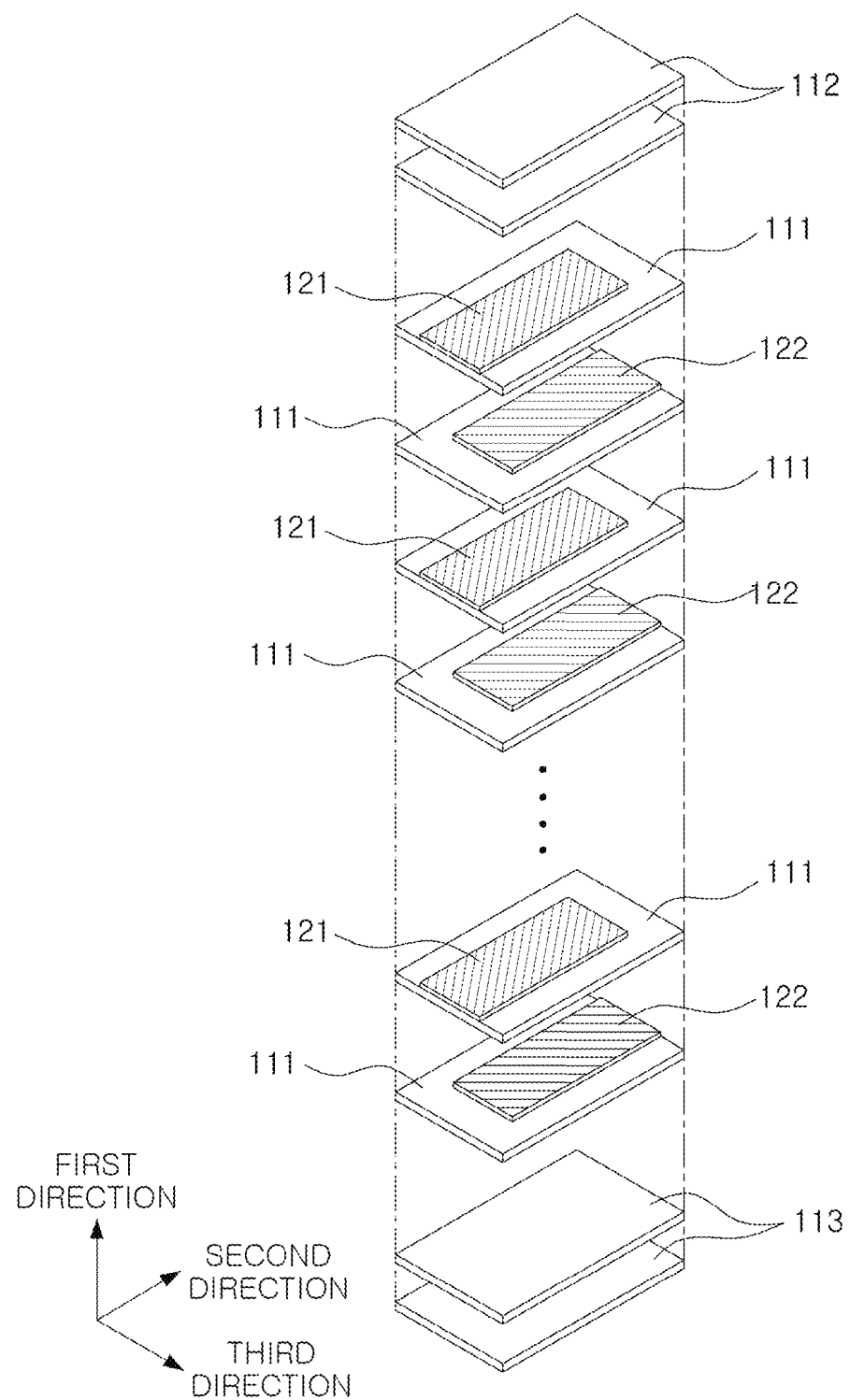
FIG. 5 is an exploded perspective view illustrating a body of the multilayer electronic component according to the example embodiment in the present disclosure.

FIG. 5 is an exploded perspective view illustrating a body of the multilayer electronic component according to the example embodiment in the present disclosure.

Figure 6:
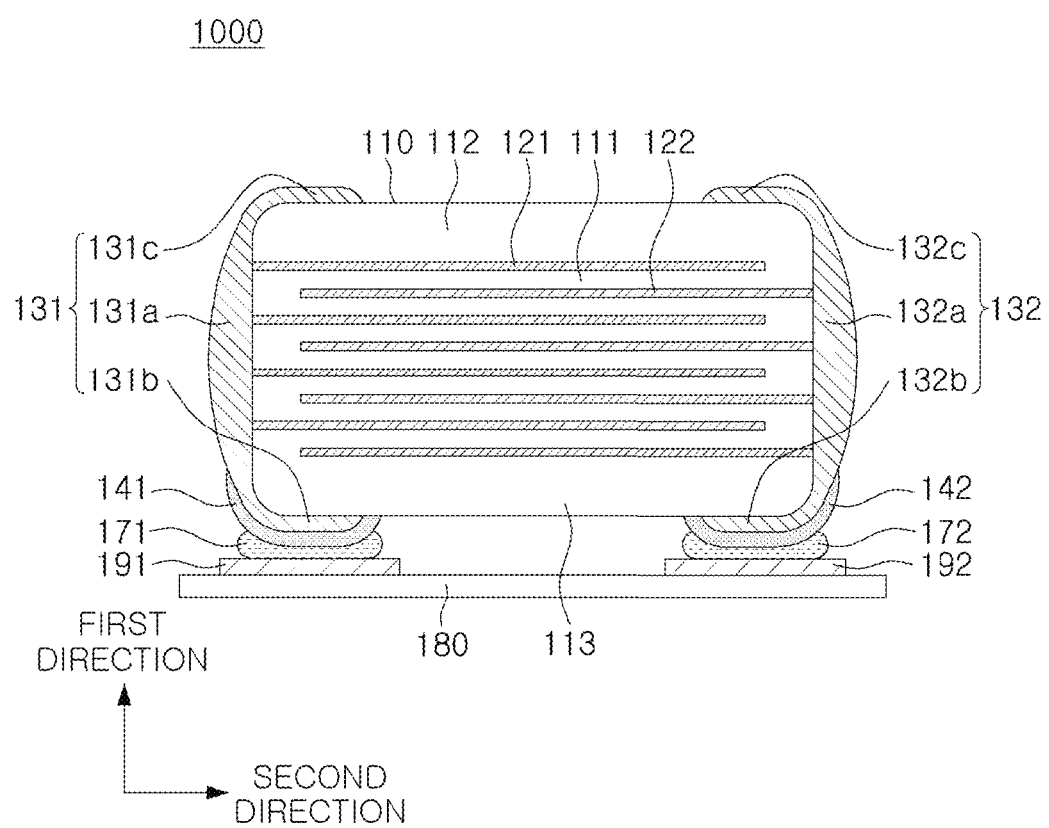
FIG. 6 is a schematic cross-sectional view of a substrate on which the multilayer electronic component according to the example embodiment in the present disclosure is mounted.

FIG. 6 is a schematic cross-sectional view of a substrate 1000 on which the multilayer electronic component according to the example embodiment in the present disclosure is mounted.

Hereinafter, the multilayer electronic component 100 according to an example embodiment will be described with reference to FIGS. 1 to 6.

According to an aspect of the present disclosure, a multilayer electronic component 100 may include: a body 110 including a dielectric layer 111, first and second internal electrodes 121 and 122 that may be alternately disposed with the dielectric layer disposed therebetween, first and second surfaces 1 and 2 opposing each other in a first direction, third and fourth surfaces 3 and 4 that may be connected to the first and second surfaces and opposing each other in a second direction, and fifth and sixth surfaces 5 and 6 that may be connected to the first to fourth surfaces and opposing each other in a third direction; a first base electrode layer 131 disposed on the third surface 3 and including a first connection portion 131a connected to the first internal electrode 121; a second base electrode layer 132 disposed on the fourth surface 4 and including a second connection portion 132a connected to the second internal electrode 121; a first electrode layer 141 disposed on a region including the third surface 3, the first surface 1, and the second surface 2, and formed to expose at least a portion of the first base electrode layer 131; and a second electrode layer 142 disposed on a region including the fourth surface 4, the first surface 1, and the second surface 2 and formed to expose at least a portion of the second base electrode layer, wherein the first and second base electrode layers 131 and 132 include Cu, and the first and second electrode layers 141 and 142 include Ag.

The body 110 may include the dielectric layer 111 and the internal electrodes 121 and 122 alternately stacked therein.

A shape of the body 110 may not be particularly limited, but may be a hexahedral shape or a shape similar to the hexahedral shape, as illustrated in FIG. 1. Although the body 110 does not have a hexahedral shape having perfectly straight lines due to contraction of ceramic powders included in the body 110 in a firing process, the body 110 may have substantially the hexahedral shape.

The body 110 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

In an example embodiment, the body 110 has a 1-3th corner connecting the first and third surfaces 1 and 3, a 1-4th corner connecting the first and fourth surfaces 1 and 4, and a 2-3th corner connecting the second and third surfaces 2 and 3, and a 2-4th corner connecting the second and fourth surfaces 2 and 4, in which the 1-3th corner and the 2-3th corner may have a shape contracted toward a center of the body in the first direction as 1-3th corner and the 2-3th corner approach the third surface, and the 1-4th corner and the 2-4th corner may have a shape contracted toward the center of the body in the first direction as 1-4th corner and the 2-4th corner approach the fourth surface.

As a margin region in which the internal electrodes 121 and 122 are not disposed overlaps on the dielectric layer 111, a step difference is generated due to the thickness of the internal electrodes 121 and 122, so a corner connecting the first surface and the third to fifth surfaces and/or a corner connecting the second surface and the third to fifth surfaces may have a shape contracted toward the center of the body 110 in the first direction when viewed with respect to the first surface or the second surface. Alternatively, by the shrinkage behavior of the body during a sintering process, a corner connecting the first surface 1 and the third to sixth surfaces 3, 4, 5, and 6 and/or a corner connecting the second surface 2 and the third to sixth surfaces 3, 4, 5 and 6 may have a shape contracted toward the center of the body 110 in the first direction when viewed with respect to the first surface 1 or the second surface 2. Alternatively, as a separate process is performed to round the corners connecting each surface of the body 110 to prevent chipping defects or the like, the corner connecting the first surface 1 and the third to sixth surfaces 3 to 6 and/or the corner connecting the second surface 2 and the third to sixth surfaces 3 to 6 may have a round shape.

The corner may include a 1-3th corner connecting the first surface 1 and the third surface 3, a 1-4th corner connecting the first surface 1 and the fourth surface 4, and a 2-3th corner connecting the second surface 2 and the third surface 3, and a 2-4th corner connecting the second surface 2 and the fourth surface 4. In addition, the corner may include a 1-5th corner connecting the first surface 1 and the fifth surface 5, a 1-6th corner connecting the first surface 1 and the sixth surface 6, and a 2-5th corner connecting the second surface 2 and the fifth surface 5, and a 2-6th corner connecting the second surface 2 and the sixth surface 6. The first to sixth surfaces 1 to 6 of the body 110 may be substantially flat surfaces, and a non-flat region may be viewed as a corner. Hereinafter, extension lines of each surface may mean lines extending with respect to flat portions of each surface.

In this case, among the base electrode layers 131 and 132, a region disposed on the corner of the body 110 may be referred to as a corner portion, and regions disposed on the third and fourth surfaces 3 and 4 of the body 110 may be referred to as connection portions, and regions disposed on the first surface 1 and the second surface 2 may be referred to as band portions.

Meanwhile, in order to suppress a step difference due to the internal electrodes 121 and 122, after the internal electrodes are stacked and are cut to be exposed to the fifth and sixth surfaces 5 and 6 of the body, when a single dielectric layer or two or more dielectric layers are stacked on both sides of a capacitance forming portion Ac in a third direction (width direction) to forming margin portions 114 and 115, a part connecting the first surface 1 and the fifth and sixth surfaces 5 and 6 and a part connecting the second surface 2 and the fifth and sixth surfaces 5 and 6 may not have a contracted shape.

The plurality of dielectric layers 111 forming the body 110 may be in a fired state, and adjacent dielectric layers 111 may be integrated with each other so that boundaries therebetween are not readily apparent without using a scanning electron microscope (SEM).

According to an example embodiment in the present disclosure, a raw material for forming the dielectric layer 111 may not be particularly limited as long as sufficient capacitance may be obtained. For example, a barium titanate-based material, a lead composite perovskite-based material, a strontium titanate-based material, or the like may be used. The barium titanate-based material may include $BaTiO_3$-based ceramic powder, and examples of the ceramic powder may include $BaTiO_3$, $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$, and $Ba(Ti_{1-y}Zr_y)O_3$ $(0<y<1)$ in which calcium (Ca), zirconium (Zr), or the like is partially dissolved in the $BaTiO_3$, or the like.

In addition, a raw material of the dielectric layer 111 may be prepared by adding various ceramic additives, organic solvents, binders, dispersants, and the like, to powders such as the barium titanate ($BaTiO_3$) powder, according to an object of the present disclosure.

The body 110 may include the capacitance forming portion Ac that forms capacitance, including the first and second internal electrodes 121 and 122 that are disposed in the body 110 and are disposed to oppose each other with the dielectric layer 111 disposed therebetween, and cover portions 112 and 113 that are disposed above and below the capacitance forming portion Ac.

In addition, the capacitance forming portion Ac is a part that contributes to the formation of capacitance of a capacitor and may be formed by repeatedly stacking the plurality of first and second internal electrodes 121 and 122 with the dielectric layer 111 disposed therebetween.

The cover portions 112 and 113 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by stacking a single dielectric layer or two or more dielectric layers on upper and lower surfaces of the capacitance forming portion, respectively, in a vertical direction, and may basically serve to prevent damage to the internal electrodes due to physical or chemical stress.

The upper cover portion 112 and the lower cover portion 113 do not include the internal electrode and may include the same material as the dielectric layer 111.

That is, the upper and lower cover portions 112 and 113 may include a ceramic material such as a barium titanate ($BaTiO_3$)-based ceramic material.

In addition, the margin portions 114 and 115 may be disposed on a side surface of the capacitance forming portion Ac.

The margin portions 114 and 115 may include a first margin portion 114 disposed on the fifth surface 5 of the body 110 and a second margin portion 115 disposed on the sixth surface 6 of the body 110. That is, the margin portions 114 and 115 may be disposed on both end surfaces of the body 110 in a width direction.

As illustrated in FIG. 4, the margin portions 114 and 115 may mean a region between both ends of the first and second internal electrodes 121 and 122 and a boundary surface of the body 110 in a cross-section of the body 110 in a width-thickness (W-T) direction.

The margin portions 114 and 115 may basically serve to prevent damage to the internal electrode due to physical or chemical stress.

The margin portions 114 and 115 may be formed by forming internal electrodes by applying a conductive paste to a ceramic green sheet except a location in which the margin portion is to be formed.

In addition, in order to suppress the step difference due to the internal electrodes 121 and 122, after the internal electrodes are stacked and cut to be exposed to the fifth and sixth surfaces 5 and 6 of the body, a single dielectric layer or two or more dielectric layers are stacked on both sides of the capacitance forming portion Ac in the third direction (width direction) to form the margin portions 114 and 115.

The internal electrodes 121 and 122 are alternately stacked with the dielectric layer 111.

The internal electrodes 121 and 122 may include the first and second internal electrodes 121 and 122. The first and second internal electrodes 121 and 122 may be alternately disposed to oppose each other with the dielectric layer configuring the body 110 interposed therebetween, and may be exposed to the third and fourth surfaces 3 and 4 of the body 110, respectively.

Referring to FIG. 3, the first internal electrode 121 may be spaced apart from the fourth surface 4 and exposed through the third surface 3, and the second internal electrode 122 may be spaced apart from the third surface 3 and exposed through the fourth surface 4. The first base electrode layer 131 may be disposed on the third surface 3 of the body 110 and connected to the first internal electrode 121, and the second base electrode layer 132 may be disposed on the fourth surface 4 of the body and connected to the second internal electrode 122.

That is, the first internal electrode 121 may not be connected to the second base electrode layer 132, but may be connected to the first base electrode layer 131, and the second internal electrode 122 may not be connected to the first base electrode layer 131 and may be connected to the second base electrode layer 132. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically insulated from each other by the dielectric layer 111 disposed therebetween.

The body 110 may be formed by alternately stacking a ceramic green sheet on which the first internal electrode 121 is printed and a ceramic green sheet on which the second internal electrode 122 is printed, and then firing the ceramic green sheet.

The material for forming the internal electrodes 121 and 122 may not be particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing, on a ceramic green sheet, a conductive paste for the internal electrode that includes at least one of nickel (Ni), copper (Cu), palladium (Pd), silver (Ag), gold (Au), platinum (Pt), tin (Sn), tungsten (W), titanium (Ti), and alloys thereof. A method of printing a conductive paste for the internal electrode may be a screen printing method, a gravure printing method, or the like, but the present disclosure is not limited thereto.

The first and second base electrode layers 131 and 132 may be disposed outside the body 110. The structure in which the multilayer electronic component 100 includes two external electrodes 131 and 132 is described in the present exemplary embodiment, but the number, shapes, or the like, of base electrode layers 131 and 132 may be changed depending on the shapes of the internal electrodes 121 and 122 or other purposes.

The first base electrode layer 131 may be disposed on the third surface 3 and may include a first connection portion 131*a* connected to the first internal electrode 121, and the second base electrode layer 132 may be disposed on the fourth surface 4 and may include a second connection portion 132*a* connected to the second internal electrode 122.

However, the present disclosure is not limited to a structure in which the first and second base electrode layers are disposed only on the third surface 3 and the fourth surface 4 and are not disposed on other surfaces 1, 2, 5, and 6 of the body 110.

That is, the first base electrode layer 131 may further include a first band portion 131*b* disposed to extend from the first connection portion 131*a* to a portion of the first surface 1, and a third band portion 131*c* disposed to extend from the first connection portion to a portion of the second surface 2, the second base electrode layer 132 may further include a second band portion 132*b* disposed to extend from the second connection portion 132*a* to a portion of the first surface 1, and a fourth band portion 132*c* disposed to extend from the second connection portion to a portion of the second surface 2.

In addition, the first base electrode layer 131 may include a first side band portion extending from the first connection portion 131*a* to a portion of the fifth and sixth surfaces 5 and 6, and the second base electrode layer 132 may further include a second side band portion extending from the second connection portion 132*a* to a portion of the fifth and sixth surfaces.

However, the third band portion, the fourth band portion, the first side band portion, and the second side band portion may not be essential components of the present disclosure. That is, the first base electrode layer 131 may include the first connection portion 131*a* and the first band portion 131*b*, and the second base electrode layer 132 may include the second connection portion 132*a* and the second band portion 132*b*, and the first and second base electrode layers 131 and 132 may not be disposed on the second surface 2, and may also be disposed on the fifth surface 5 and the sixth surface 6.

The first and second base electrode layers 131 and 132 may include Cu. Cu has an advantage of having excellent electrical connectivity with metals included in the internal electrodes 121 and 122.

Meanwhile, the first and second base electrode layers 131 and 132 may include Cu as a main component and other metals having excellent electrical conductivity as other materials. For example, the first and second base electrode layers 131 and 132 may further include one or more of Ni, Pd, Ag, Sn, Cr, and alloys thereof.

The first and second base electrode layers 131 and 132 may be firing electrodes including Cu and glass, or resin-based electrodes including Cu and resin.

In addition, the first and second base electrode layers 131 and 132 may be in a form in which the firing electrode and the resin-based electrode are sequentially formed on the body 110. In addition, the first and second base electrode layers 131 and 132 may be formed by transferring a sheet including Cu onto the body 110 or by transferring the sheet including Cu onto the firing electrode.

According to an example embodiment in the present disclosure, the first and second base electrode layers 131 and 132 may include Cu, to thereby improve electrical connectivity with the internal electrodes 121 and 122. Meanwhile, the first and second base electrode layers 131 and 132 may further include glass in order to improve adhesion to the body 110 and to improve density.

The first electrode layer 141 may be disposed on a region including the third surface 3, the first surface 1, and the second surface 2, and may be formed to expose at least a portion of the first base electrode layer 131. The second electrode layer 142 may be disposed on a region including the fourth surface 4, the first surface 1, and the second surface 2, and may be formed to expose at least a portion of the second base electrode layer 132.

Methods of forming the first and second electrode layers 141 and 142 to expose at least a portion of the first and second base electrode layers 131 and 132 may be varied.

For example, the first electrode layer 141 may be disposed on the first band portion 131*b* and the second electrode layer 142 may be disposed on the second band portion 132*b*, to expose at least a portion of the first and second base electrode layers 131 and 132 in which the first and second electrode layers 141 and 142 are not disposed.

As another example, in a similar manner to the multilayer electronic components 200, 201, 202, 203, and 204 according to an embodiment to be described later, if the first base electrode layer 131 disposed on the third surface 3 is referred to as a first connection electrode 231*a*, and the second base electrode layer 132 disposed on the fourth surface 4 is referred to as a second connection electrode 232, the first electrode layer 141 may be disposed on the first surface 1 and connected to the first connection electrode 231 to form a first band electrode 241, and the second electrode layer 142 may be disposed on the first surface 1 and connected to the second connection electrode 232 to form a second band electrode 242, to expose at least a portion of the first and second connection electrodes 231 and 232 not covered by the first and second band electrodes 241 and 242.

As another example, in a similar manner to the multilayer electronic components 300 and 301 according to an embodiment to be described later, the first base electrode layer 331 may further include a first band portion 331b disposed to extend from the first connection portion 331a to a portion of the first surface 1, a third band portion 331c disposed to extend from the first connection portion 331a to a portion of the second surface 2, and the second base electrode layer 332 may include a second band portion 332b disposed to extend from the second connection portion 332a to a portion of the first surface 1, and a fourth band portion disposed to extend from the second connection portion 332a to a portion of the second surface 2, the first electrode layer 341 may be disposed on the first connection portion 331a, and the second electrode layer 342 may be disposed on the second connection portion 332a, to expose at least a portion of the first and second base electrode layers 331 and 332 in which first and second electrode layers 341 and 342 are not disposed.

The first and second electrode layers 141 and 142 may include Ag. The first and second electrode layers 141 and 142 may be firing electrodes including Ag and glass, or may be Ag plating layers formed by plating.

The first and second electrode layers 141 and 142 include Ag having a large standard reduction potential compared to Cu included in the first and second base electrode layers, and thus, may serve to prevent the first and second base electrode layers from being oxidized and prevent moisture from being penetrated.

In addition, since the multilayer electronic component 100 may be mounted on the substrate 180 by the conductive adhesive including a conductive metal and a resin, it is possible to solve a problem of occurrence of solder cracks due to a difference in a coefficient of thermal expansion between an external electrode and a solder in a high-temperature and low-temperature cycle.

However, when the first and second electrode layers 141 and 142 including silver (Ag) are formed on the first and second base electrode layers 131 and 132, Ag ion migration may occur along the surface of the body 110. Accordingly, due to the leakage current of the multilayer electronic component 100, an insulation resistance may deteriorate and a short circuit may occur between the base electrode layers 131 and 132 or between the electrode layers 141 and 142 having different polarities.

In a high-temperature and high-humidity environment, the possibility that moisture or contaminants are present on the surface of the multilayer electronic component 100 may be increased. When a voltage is applied in this state, metal ions dissolved in a positive electrode moves to a negative electrode, so precipitation may occur at the negative electrode. As the reaction continues, metal dendrites grow along the surface of the body 110 from the negative electrode to the positive electrode, and this phenomenon is called ion migration.

In particular, it is known that a metal conductor in which the ion migration occurs most easily is Ag. When the external electrode includes Ag or Ag is used alone, the Ag ion migration may occur more easily on the surface of the body 110.

Since the Ag ion migration occurs on the surface of the body 110 between the external electrodes of the multilayer electronic component, the insulation layer on the surface of the body 110 is destroyed by the leakage current, so the insulation resistance of the multilayer electronic component 100 may be reduced and a short circuit between electrodes may occur, to thereby have a fatal influence on the reliability of the multilayer electronic component 100.

Meanwhile, it is known that main factors of controlling a growth rate of the Ag ion migration are voltage and humidity. As the multilayer electronic component 100 is away from a mounting surface, the possibility of exposure to the external environment may be increased and an area in contact with air may be increased, so the multilayer electronic component 100 may be more affected by moisture. Accordingly, as the multilayer electronic component is away from the mounting surface, the Ag ion migration tends to occur more strongly in the multilayer electronic component.

Accordingly, by controlling the positions and regions in which the first and second electrode layers 141 and 142 including Ag are disposed, the present disclosure is to secure the reliability of the multilayer electronic component in the high-temperature and high-humidity environment while minimizing the occurrence of the Ag ion migration.

According to an example embodiment in the present disclosure, the first and second electrode layers 141 and 142 including silver (Ag) may be disposed on the first and second band portions.

As the first electrode layer 141 is disposed on the first band portion 131b and the second electrode layer 142 is disposed on the second band portion 132b, the Ag ion migration that may occur when the first and second electrode layers 141 and 142 are disposed on the entire surface of the first and second base electrode layers 131 and 132 may be effectively suppressed. In addition, the region in which the first electrode layer and the second electrode layer 141 and 142 are disposed may be reduced, and thus, the application amount of paste including Ag may be reduced, to thereby reduce the manufacturing cost of the multilayer electronic component 100.

As described above, since the Ag ion migration tends to occur more strongly in a direction opposite to the mounting surface of the multilayer electronic component 100, in the case of the example embodiment in the present disclosure in which the electrode layer including Ag is disposed on the first and second band portions 131b and 132b close to the mounting surface, the effect of inhibiting the Ag ion migration may be more significant.

Accordingly, it is possible to mount the electrode layers 141 and 142 including Ag on the substrate 180 by the conductive adhesives 171 and 172 including a conductive metal and a resin while minimizing the region in which the electrode layers 141 and 142 are disposed. Accordingly, it is possible to suppress the occurrence of the Ag ion migration to prevent the deterioration in the insulation resistance and the short circuit, to prevent the oxidation in the mounting region of the first and second base electrode layers 131 and 132 including Cu, and to prevent a decrease in adhesion strength by enabling mounting through a conductive adhesive including a conductive metal and a resin.

One of the other factors of controlling the growth rate of the Ag ion migration may be components of the first and second electrode layers. The metal in which the ion migration is most likely to occur is known as Ag, and when the first and second electrode layers 141 and 142 are formed of Ag alone, when Ag is partially condensed within the electrode layer, or when the content of Ag is excessive, the Ag ion migration may occur more strongly.

In an example embodiment, the first and second base electrode layers 131 and 132 may further include glass, and the first and second electrode layers 141 and 142 may further include glass and palladium (Pd).

As the first and second electrode layers 141 and 142 include glass, the adhesion to the base electrode layers 131 and 132 including glass may be improved.

When the first and second electrode layers 141 and 142 further include palladium (Pd), Ag and Pd form isomorphous, to thereby effectively suppress the Ag ion migration. In addition, since the standard reduction potential (+0.915V) of Pd is higher than the standard reduction potential (0.80V) of Ag, it is possible to more effectively prevent the first and second base electrode layers 131 and 132 from being oxidized.

In this case, the content of Pd included in the first and second electrode layers 141 and 142 may be 1 mol or more and 5 mol or less relative to 100 mol of Ag.

When the content of Pd is less than 1 mol relative to 100 mol of Ag, it is difficult to sufficiently form the isomorphous with Ag, so the effect of suppressing the Ag ion migration may be insufficient.

On the other hand, when the content of Pd is more than 5 moles relative to 100 moles of Ag, since a driving force for sintering of Pd is generally higher than that of Ag, blisters, radiation cracks, and the like may occur due to the difference in the driving forces for sintering, so the manufacturing cost may be increased.

Meanwhile, the components of the first and second base electrode layers 131 and 132 and the first and second electrode layers 141 and 142 may be produced from images observed using scanning electron microscope-energy dispersive X-ray spectroscopy (SEM-EDS). Specifically, after the multilayer electronic component is polished to a central position in the width direction (third direction) to expose a longitudinal and thickness direction cross-section (L-T cross-section), it is possible to measure a type of each element included in the base electrode layer and the electrode layer and a content of each element relative to 100 at % of the total element by using the EDS in the central region among regions in which the base electrode layer and the electrode layer are divided into 5 equal parts in the thickness or longitudinal direction.

Meanwhile, when the multilayer electronic component 100 is mounted through the conductive adhesives 171 and 172 including a conductive metal and a resin, it is necessary to sufficiently secure the contact area between the conductive adhesives 171 and 172 and the first and second electrode layers 141 and 142 to secure the adhesion strength.

In an example embodiment, the first electrode layer 141 may be disposed to extend from the first band portion 131b to a portion of the first connection portion 131a, and the second electrode layer 142 may be disposed to extend from the second band portion 132b to a portion of the second connection portion 132a to sufficiently secure the contact area between the conductive adhesives 171 and 172 and the first and second electrode layers 141 and 142, to thereby improve the adhesion strength of the multilayer electronic component 100.

In an example embodiment, an average size TB1 of the first and second electrode layers 141 and 142 in the first direction from a lowest point in the first direction to a highest point in the first direction may be 10 μm or more and 40 μm or less. When the TB1 is less than 10 μm, the first and second electrode layers 141 and 142 may not sufficiently cover the first and second band portions 131b and 132b, so it may be difficult to sufficiently secure the adhesion strength, and when the TB1 exceeds 40 μm, the first and second electrode layers 141 and 142 are excessively formed on the first and second connection portions 131a and 132a, so it may be difficult to suppress the occurrence of the Ag ion migration.

From a similar point of view, in an example embodiment, when an average size in the first direction from the first surface 1 to the internal electrode disposed closest to the first surface among the first and second internal electrodes 121 and 122 is H1 and an average size in the first direction from an extension line of the first surface 1 to ends of the first and second electrode layers 141 and 142 disposed on the first and second connection portions 131a and 132a is H2, H1≥H2 may be satisfied. That is, since the first and second electrode layers 141 and 142 are disposed in a region below the first and second internal electrodes 121 and 122 disposed at a lowermost end, it is possible to effectively suppress the Ag ion migration while sufficiently securing the adhesion strength.

Meanwhile, the average size TB1 in the first direction, from a lowest point of the first and second electrode layers 141 and 142 to a highest point of the first and second electrode layers 141 and 142 in the first direction, may be a value obtained by averaging values measured on a side of the first electrode layer 141 and values measured on a side of the second electrode layer 142, in a cross-section (an L-T plane) taken in a central portion of the body 110 in the third direction, in the first and second directions.

In an example embodiment, an average thickness td of the dielectric layer 111 and an average thickness te of the internal electrodes 121 and 122 may satisfy td>2*te. That is, according to an exemplary embodiment, the thickness td of the dielectric layer 111 may be greater than two times the thickness te of each of (or one of) the internal electrodes 121 and 122.

Generally, in a high-voltage electrical component, a reliability problem depending on a decrease in a break-down voltage under a high voltage environment may be important. In the multilayer electronic component according to an exemplary embodiment, the average thickness td of the dielectric layer 111 may be set to be greater than two times the average thickness te of each of the internal electrodes 121 and 122 in order to prevent the decrease in the break-down voltage under the high voltage environment, to thereby improve the characteristics of the break-down voltage. When the average thickness td of the dielectric layer 111 is equal to or less than two times the average thickness te of each of (or one of) the internal electrodes 121 and 122, the thickness of the dielectric layer, which is the distance between the internal electrodes, may be small, such that the break-down voltage may be decreased.

The average thickness te of the internal electrode may be less than 1 μm, and the average thickness td of the dielectric layer may be less than 2.8 μm. However, the average thickness te of the internal electrode and the average thickness td of the dielectric layer are not necessarily limited thereto.

The average thickness td of the dielectric layer 111 and the average thickness te of the internal electrodes may be measured by scanning an image of the length and thickness direction (L-T) cross-section of the body 110 with a scanning electron microscope (SEM) having a magnification of 10,000×. More specifically, the average value may be measured by measuring the thickness of the internal electrode of one dielectric layer at 30 points at equal intervals in the longitudinal direction in the scanned image. The 30 points at equal intervals may be designated in the capacitance forming portion (Ac). In addition, when the average value is measured by expanding the measurement of the average value to 10 dielectric layers and internal electrodes, the average thickness of the dielectric layer and the average thickness of the internal electrode may be further generalized.

Referring to FIG. 6, in a substrate 1000 on which the multilayer electronic component 100 according to an example embodiment in the present disclosure is mounted, the first and second electrode layers 141 and 142 of the multilayer electronic component 100 may be bonded to the electrode pads 191 and 192 disposed on the substrate 180 by the conductive adhesives 171 and 172.

Since the first and second electrode layers 141 and 142 according to the example embodiment in the present disclosure include silver (Ag), the electrode layers 141 and 142 and the conductive adhesives 171 and 172 may secure electrical conduction, and a resin included in the conductive adhesives 171 and 172 may be cured to secure the adhesion to the substrate 180.

In addition, when the conventional multilayer electronic component 100 is mounted on the substrate 180, unlike the case of using solder including tin (Sn), by alleviating a thermal shock applied to the electrode layers 141 and 142 and the conductive adhesives 171 and 172 even in the high-temperature cycle, it is possible to improve the adhesion strength of the multilayer electronic component 100.

The type of conductive metal included in the conductive adhesives 171 and 172 is not particularly limited, and may include, for example, a metal such as Ag or Au.

In an example embodiment, the resin included in the conductive adhesives 171 and 172 may be an epoxy resin. The epoxy resin has a coefficient of thermal expansion smaller than that of the solder, and thus, it is possible to suppress cracks due to thermal expansion and thermal contraction due to a change in temperature in the high-temperature environment. In the conventional case of mounting the multilayer electronic component on the substrate through the solder including tin (Sn), the solder cracks are likely to occur due to stress due to the difference in the coefficient of thermal expansion between the external electrode and the solder in the high-temperature-low-temperature cycle. According to an example embodiment in the present disclosure, since the conductive adhesives 171 and 172 include a resin, the difference in the coefficient of thermal expansion between the first and second electrode layers 141 and 142 and the conductive adhesive may be reduced, and thus, it is possible to solve the problem of the occurrence of cracks in the conductive adhesive. In addition, by including the epoxy resin, the conductive adhesive may be easily cured at room temperature and heat cured depending on its content, and may secure excellent adhesion.

In an example embodiment, examples of the type of resin included in the conductive adhesives 171 and 172 may include an epoxy resin, but the present disclosure is not limited thereto, and polyurethane, silicone, polyimide, phenol, and polyester-based thermosetting resins may be used.

Figure 7:
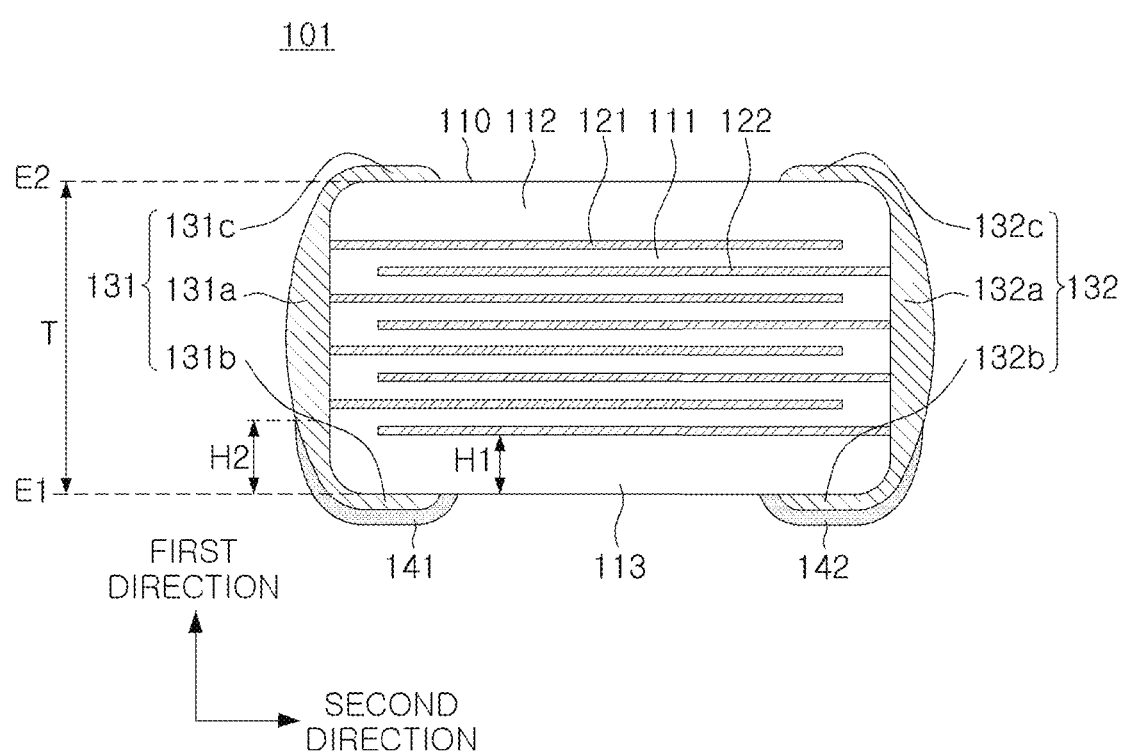
FIG. 7 is a cross-sectional view illustrating the multilayer electronic component according to the example embodiment in the present disclosure.

FIG. 7 is a cross-sectional view illustrating a multilayer electronic component 101 according to the example embodiment.

Referring to FIG. 7, in the multilayer electronic component 101 according to an example embodiment, when an average size in the first direction from the first surface 1 to the internal electrode disposed closest to the first surface among the first and second internal electrodes 121 and 122 is H1 and an average size in the first direction from an extension line of the first surface to ends of the first and second electrode layers disposed on the first and second connection portions 131a and 132a is H2, H1<H2 may be satisfied.

When portions not covered with the first and second electrode layers 141 and 142 including Ag among the first and second base electrode layers 131 and 132 including Cu are exposed to the outside, the portions may be vulnerable to penetration of moisture from the outside. In particular, in the case where the first and second base electrode layers 131 and 132 are firing electrodes formed of a conductive paste, when the oxidation of Cu occurs in a region where the thickness (size in the second direction) of the first and second connection portions 131a and 132a is decreased in the first direction, the first and second connection portions 131a and 132a may be a main penetration path of moisture from the outside.

According to the multilayer electronic component 101 according to the example embodiment, by satisfying H1<H2, the first and second electrode layers 141 and 142 are disposed to extend to a region where the thickness (size in the second direction) of the first and second connection portions 131a and 132a is thin, and thus, the main penetration path of moisture from the outside may be blocked, so it is possible to improve the moisture resistance reliability of the multilayer electronic component 101.

Meanwhile, as described above, the Ag ion migration tends to occur more strongly from the mounting surface of the multilayer electronic component 101 toward the direction opposite to the mounting surface. Accordingly, when the first and second electrode layers 141 and 142 including Ag are formed to further extend in the first direction of the body 110, the effect of suppressing the occurrence of the Ag ion migration by forming the first and second electrode layers 141 and 142 on the first and second band portions 131b and 132b may not be sufficient. In this case, when the average size of the body in the first direction is T, the first and second electrode layers 141 and 142 including Ag are not excessively formed in the first direction by satisfying H2<T/2, so the effect of suppressing the occurrence of the Ag ion migration may be sufficiently secured. That is, the H1, H2, and T may satisfy H1<H2<T/2.

H1 and H2 may be values obtained by averaging values measured in a cross-section (an L-T plane) taken in a central portion of the body 110 in the third direction, in the first and second directions. H1 may be a value obtained by averaging distances between an internal electrode disposed closest to the first surface 1 and the first surface 1 in the cross-section at any point in the second direction, and H2 may be a value measured based on a distal end of an electrode layer disposed in a connection portion, and may be a value obtained by averaging a value measured on a side of the first band portion 141 and a value measured on a side of the second band portion 142. In this case, an extension line E1 of the first surface serving as a reference when measuring H1 and H2 may be the same.

In addition, similarly, a magnitude T in the first direction of the body 110 may be a value obtained by measuring magnitudes in the first direction of an extension line E1 of the first surface and an extension line E2 of the second surface, in a cross-section (an L-T plane) taken in a central portion of the body 110 in the third direction, in the first and second directions.

A method of controlling the regions in which the first and second electrode layers 141 and 142 are disposed is not particularly limited. After forming the first and second base electrode layers 131 and 132, the first and second electrode layers 141 and 142 may be formed by alternately immersing the first band portion 131b and the second band portion 132b in the conductive paste including Ag, drying the first band portion 131b and the second band portion 132b, and then firing the first band portion 131b and the second band portion 132b at a temperature of about 600° C. In this case, the region in which the first and second electrode layers 141 and 142 are disposed may be controlled by controlling the immersion depth of the body 110, but the present disclosure is not limited thereto.

Figure 8:
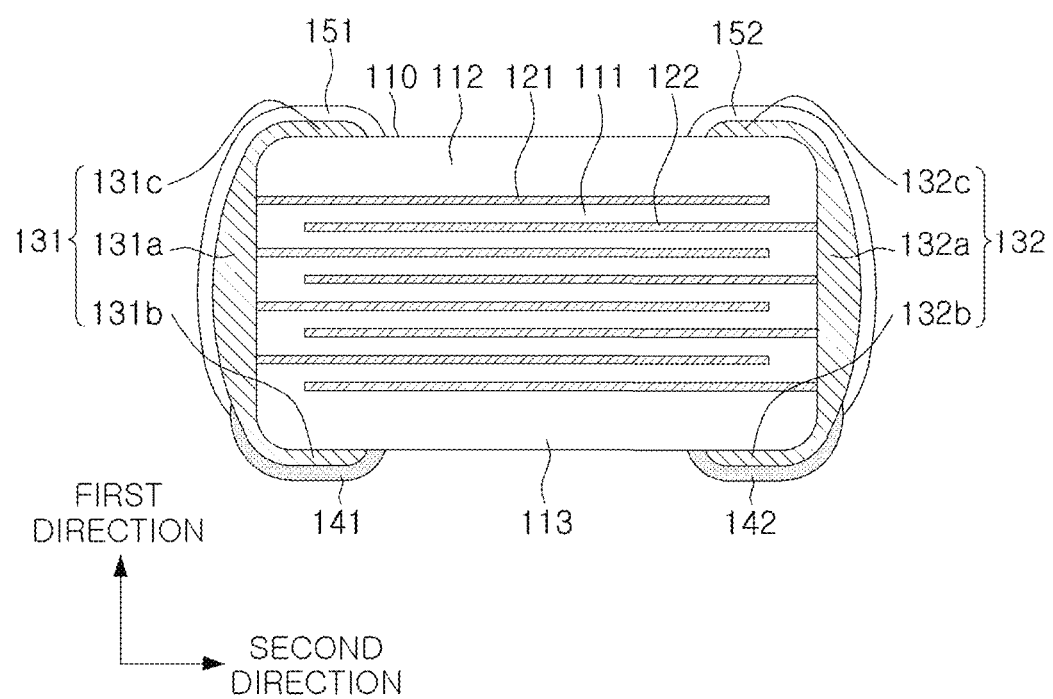
FIG. 8 is a cross-sectional view illustrating the multilayer electronic component according to the example embodiment in the present disclosure.

FIG. 8 is a cross-sectional view illustrating a multilayer electronic component 102 according to the example embodiment.

Referring to FIG. 8, the multilayer electronic component 102 according to an example embodiment may include a first insulating layer 151 disposed on the first connection portion 131a and a second insulating layer 152 disposed on the second connection portion 132a.

The first and second insulating layers 151 and 152 may be disposed on the first and second connection portions 131a and 132a to serve to prevent oxidation of Cu included in the first and second base electrode layers 131 and 132 and improve the flexural strength of the multilayer electronic component 102.

The first insulating layer 151 may be disposed on the first connection portion 131a to extend onto the third band portion 131c, and the second insulating layer 152 may be disposed on the second connection portion to extend onto the fourth band portion 132c. Accordingly, it is possible to further improve the flexural strength and sealing characteristics of the multilayer electronic component 102.

In order to significantly improve the sealing characteristics of the multilayer electronic component 102, it may be preferable that the first insulating layer 151 is disposed to cover the end of the third band portion 131c, and the second insulating layer 152 is disposed to cover the end of the fourth band portion 132c, but the present disclosure is not limited thereto.

The first and second insulating layers 151 and 152 may be formed of a material that may improve the sealing characteristics and the flexural strength of the multilayer electronic component 102 to have sufficient strength to protect the multilayer electronic component 102 from tensile stress caused by external heat or vibration. For example, the first and second insulating layers 151 and 152 may include one or more selected from materials such as an epoxy resin, an acrylic resin, and ethyl cellulose, or may further include glass.

In addition, the first and second insulating layers 151 and 152 may include a single component or a plurality of components, and may preferably include one or more selected from $TiO_2$, $BaTiO_3$, $Al_2O_3$, $SiO_2$, BaO, or the like as an additive to improve the adhesion to the body 110 or the first and second base electrode layers 131 and 132.

A method of forming first and second insulating layers 151 and 152 may vary depending on components and purposes. For example, the first and second insulating layers 151 and 152 may be formed in a manner of forming a coating film with an insulating paste using a squeegee, disposing the first and second base electrode layers 131 and 132 on the body 110, sequentially immersing each cross-section of the first and second base electrode layers 131 and 132, and then drying the first and second base electrode layers 131 and 132. In addition, the first and second insulating layers 151 and 152 may be formed by sol-gel processing, chemical vapor deposition (CVD), atomic layer deposition (ALD), or the like, but the present disclosure is not limited thereto, and the first and second insulating layers 151 and 152 may also be formed by other methods capable of forming a thin and uniform insulating layer.

Meanwhile, the components of the first and second insulating layers 151 and 152 may be produced from images observed using the scanning electron microscope-energy dispersive X-ray spectroscopy (SEM-EDS). Specifically, after the multilayer electronic component is polished to a central position in the width direction (third direction) to expose a longitudinal and thickness direction cross-section (L-T cross-section), it is possible to measure a type of each element included in the first and second insulating layers 151 and 152 and a content of each element relative to 100 at % of the total element by using the EDS in the central region among regions in which the first and second insulating layers 151 and 152 are divided into 5 equal parts in the thickness or longitudinal direction. In addition, the type of resin included in the insulating layer may be distinguished by using gas chromatograph-mass spectrometer (GC-MS) analysis.

Figure 9:
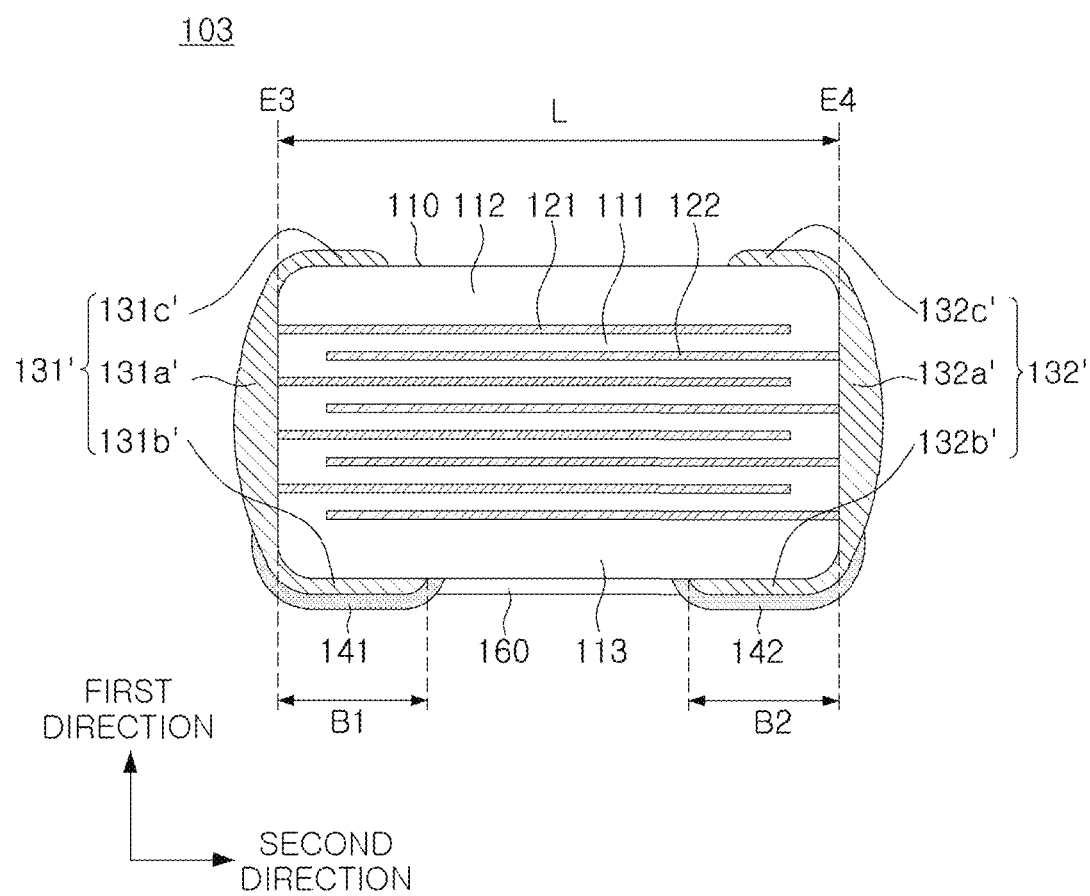
FIG. 9 is a cross-sectional view illustrating the multilayer electronic component according to the example embodiment in the present disclosure.

FIG. 9 is a cross-sectional view illustrating a multilayer electronic component 103 according to the example embodiment.

Referring to FIG. 9, in the multilayer electronic component 103 according to the example embodiment, when the average size of the body 110 in the second direction is L, the average size of the body 110 in the second direction from an extension line E3 of the third surface to the end of the first electrode layer 141 is B1, and the average size of the body 110 in the second direction from an extension line E4 of the fourth surface to the end of the second electrode layer 142 is B2, $0.2 \le B1/L \le 0.4$ and $0.2 \le B2/L \le 0.4$ may be satisfied.

When B1/L and B2/L are less than 0.2, it may be difficult to sufficiently secure the adhesion strength. On the other hand, when B2/L exceeds 0.4, there may be a risk that the leakage current is generated between the first electrode layer 141 and the second electrode layer 142 under a high-voltage current, and the first electrode layer 141 and the second electrode layer 142 are electrically connected by the spreading of the conductive adhesive during mounting.

B1, B2, and L may be values measured in a cross-section (an L-T plane) taken in a central portion of the body 110 in the third direction, in the first and second directions. In particular, a magnitude L in the second direction of the body 110 may correspond to a magnitude in the second direction between an extension line E3 of the third surface and an extension line E4 of the fourth surface.

Referring to FIG. 9, the multilayer electronic component 103 according to the example embodiment may further include an additional insulating layer 160 that is disposed on the first surface 1 but disposed between the first electrode layer 141 and the second electrode layer 142. Accordingly, it is possible to prevent the leakage current or the like that may occur between the first electrode layer 141 and the second electrode layer 142 under the high-voltage current.

The type of additional insulating layer 160 does not need to be particularly limited. For example, the additional insulating layer 160 may include an epoxy resin like the first and second insulating layers 151 and 152. However, the material of the additional insulating layer 160 is not necessarily limited to the same material as that of the first and second insulating layers 151 and 152, and may be formed of a different material from that of the first and second insulating layers 151 and 152.

Referring to FIG. 9, a first base electrode layer 131' of the multilayer electronic component 103 according to the example embodiment may include a first connection portion 131a', a first band portion 131b', and a third band portion 131c', and a second base electrode layer 132' may include a second connection portion 132a', a second band portion 132b', and a fourth band portion 132c'. In this case, the first and second band portions 131b' and 132b' may be longer in the second direction than the third and fourth band portions 131c' and 132c'. Accordingly, it is possible to improve capacity per unit volume by securing the mounting area to reduce the proportion of the base electrode layers 131' and 132' in the multilayer electronic component 103 while improving the adhesion strength of the multilayer electronic component 103.

Figure 10:
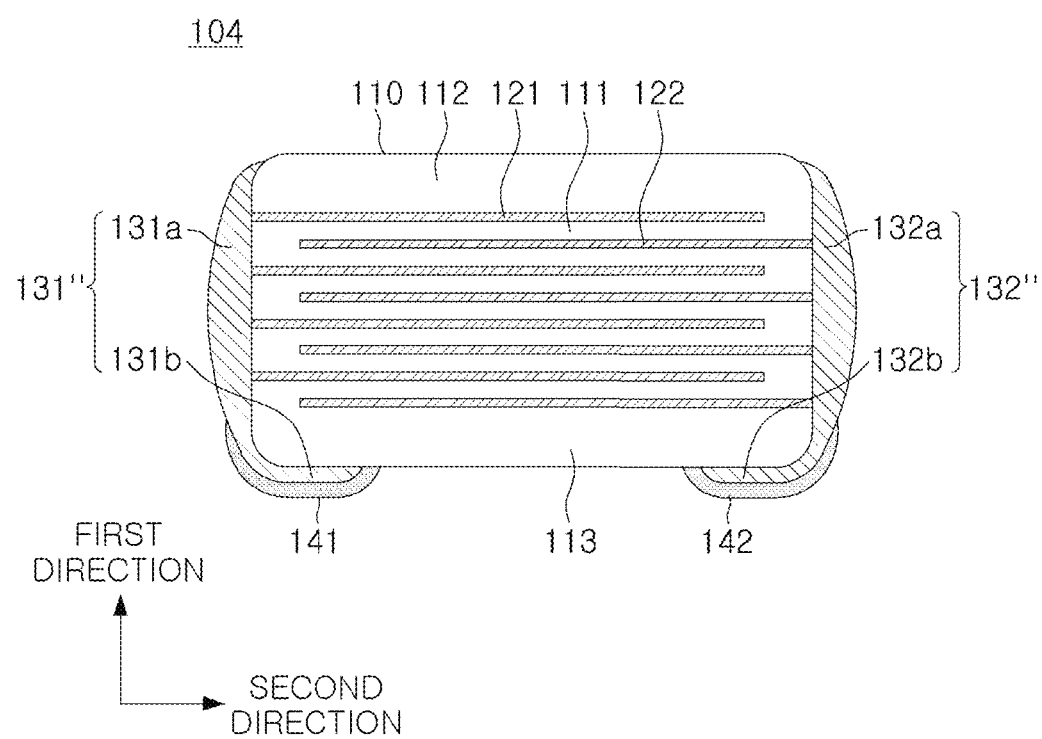
FIG. 10 is a cross-sectional view illustrating the multilayer electronic component according to the example embodiment in the present disclosure.

FIG. 10 is a cross-sectional view illustrating a multilayer electronic component 104 according to the example embodiment.

Referring to FIG. 10, a first base electrode layer 132" of the multilayer electronic component 104 according to the example embodiment may include the first connection portion 131a and the first band portion 131b, and a second base electrode layer 132" may include the second connection portion 132a and the second band portion 132b. That is, unlike the multilayer electronic component 100, the multilayer electronic component 104 may have an L-shape that does not include the third and fourth band portions 131c and 132c. Accordingly, it is possible to further improve the capacity per unit volume of the multilayer electronic component 104 by minimizing the proportion of the first and second base electrode layers 131" and 132".

Figure 11:
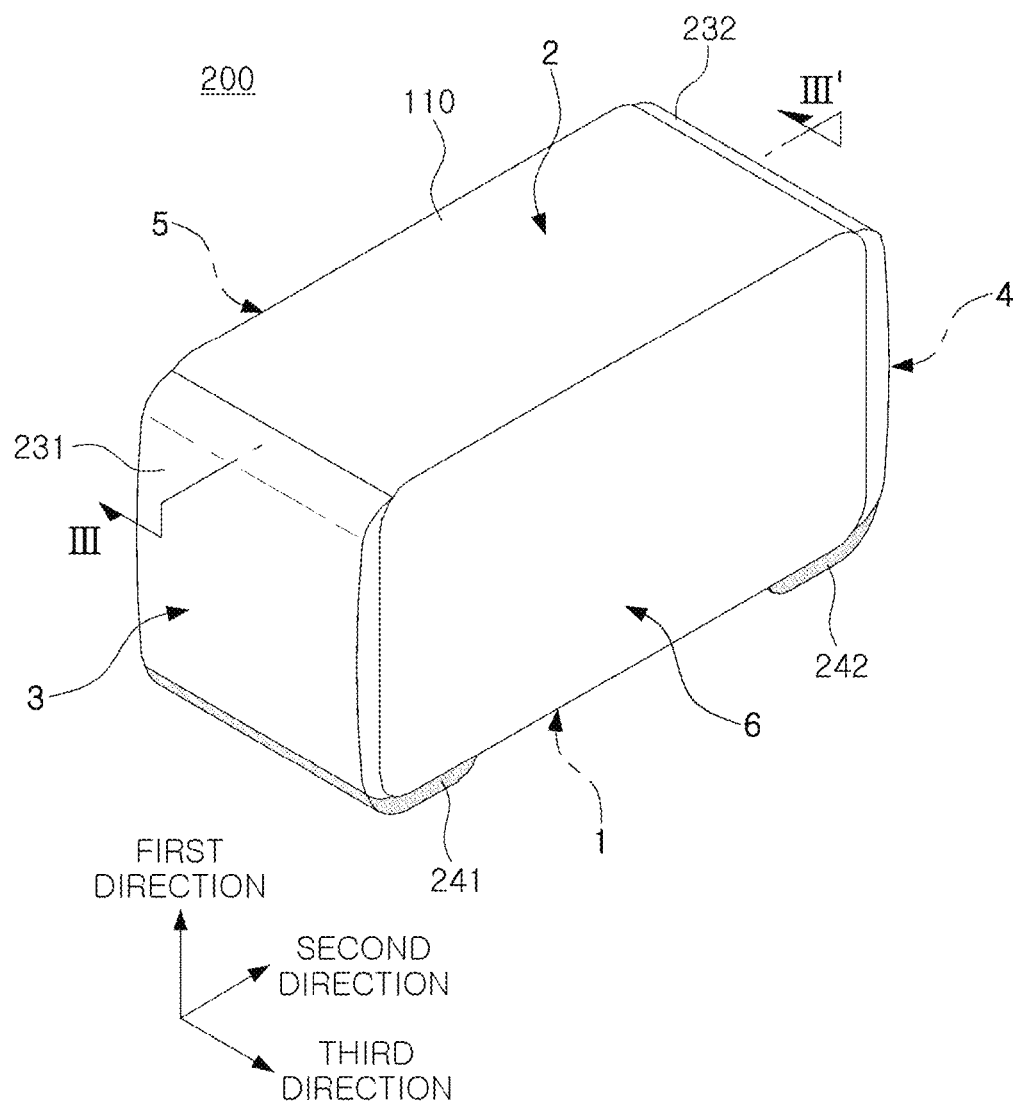
FIG. 11 is a perspective view illustrating the multilayer electronic component according to the example embodiment in the present disclosure.

FIG. 11 is a perspective view illustrating a multilayer electronic component 200 according to the example embodiment in the present disclosure.

Figure 12:
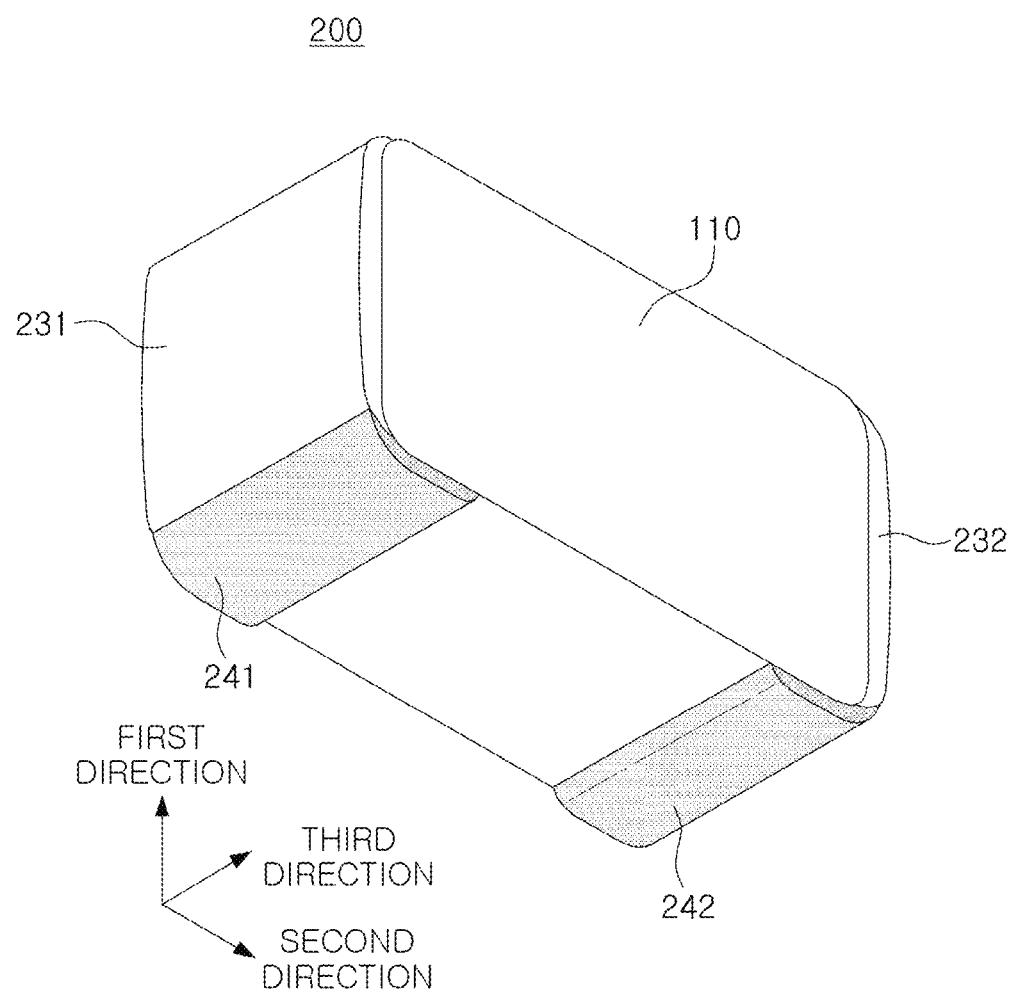
FIG. 12 is a bottom perspective view of the multilayer electronic component illustrated in FIG. 11.

FIG. 12 is a bottom perspective view of the multilayer electronic component illustrated in FIG. 11.

Figure 13:
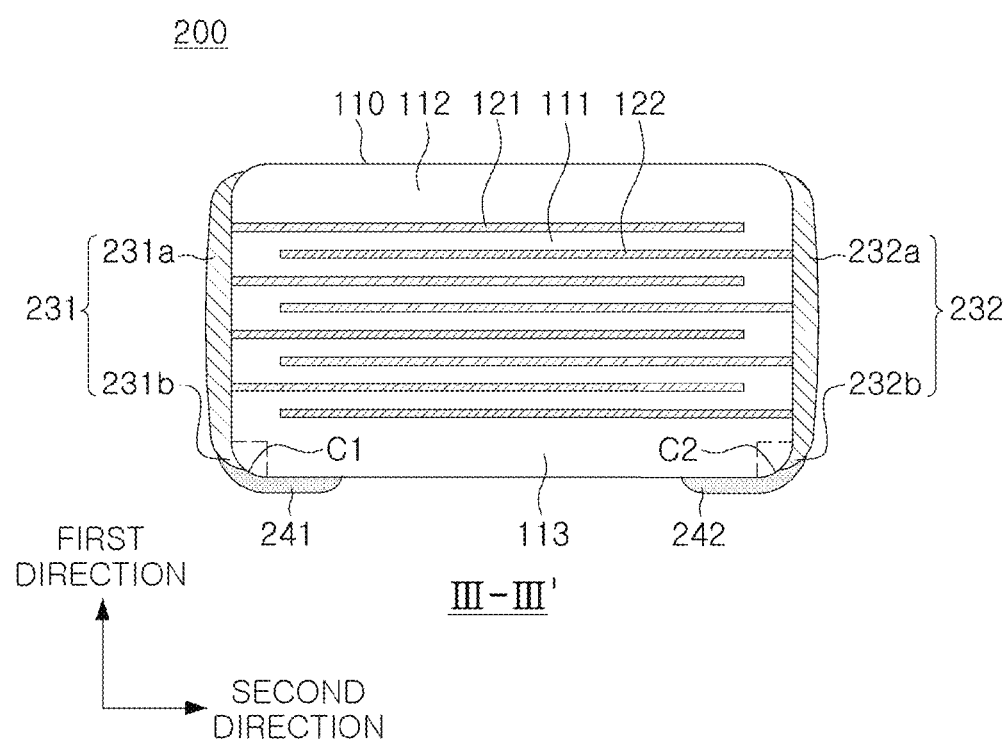
FIG. 13 is a cross-sectional view taken along line III-III' of FIG. 11.

FIG. 13 is a cross-sectional view taken along line III-III' of FIG. 11.

Figure 14:
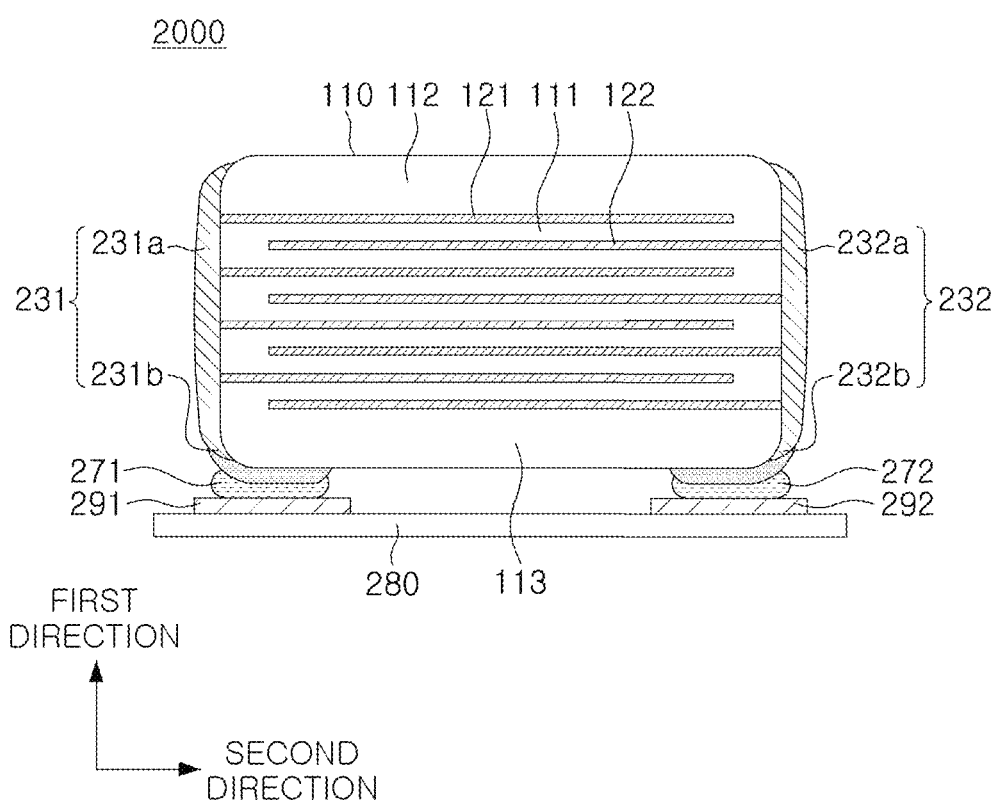
FIG. 14 is a schematic cross-sectional view of a substrate on which the multilayer electronic component according to the example embodiment in the present disclosure is mounted.

FIG. 14 schematically illustrates a cross-sectional view of a substrate 2000 on which the multilayer electronic component according to the example embodiment in the present disclosure is mounted.

Hereinafter, the multilayer electronic component 200 according to the example embodiment in the present disclosure will be described with reference to FIGS. 11 to 14. However, contents overlapping with the multilayer electronic components 100, 101, 102, 103, and 104 according to an example embodiment and various example embodiments in the present disclosure may be omitted to avoid a duplicate description.

The multilayer electronic component 200 according to the example embodiment in the present disclosure may include: a body 110 including a dielectric layer 111, first and second internal electrodes, alternately disposed with the dielectric layer 111 disposed therebetween, first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction; a first connection electrode 231 disposed on the third surface 3; a second connection electrode 232 disposed on the fourth surface 4; a first band electrode 241 disposed on the first surface 1 and connected to the first connection electrode 231; and a second band electrode 242 disposed on the first surface 1 and connected to the second connection electrode 232, in which the first and second connection electrodes 231 and 232 may include Cu, and the first and second band electrodes 241 and 242 may include Ag.

The first connection electrode 231 may be disposed on the third surface 3 to be connected to the first internal electrode 121, and the second connection electrode 232 may be disposed on the fourth surface 4 to be connected to the second internal electrode 122.

The first connection electrode 231 may include a first connection portion 231a disposed on the third surface 3 and a first corner portion 231b disposed to extend from the first connection portion 231a to a corner C1 connecting the first surface 1 and the third surface 3, and the second connection electrode 232 may include a second connection portion 232a disposed on the fourth surface 4 and a second corner portion 232b disposed at a corner C2 connecting the first surface 1 and the fourth surface 4 from the second connection portion 232a.

Conventionally, in order to form an external electrode, a method of using a paste including a conductive metal to dip an exposed surface of an internal electrode of a body into the paste has been mainly used. However, in the external electrode formed by the dipping method, a thickness of the external electrode in a central portion in a thickness direction may be too thick. In addition, even if there is no problem of imbalance of the thickness of the external electrode according to the dipping method, since the internal electrode is exposed to the third and fourth surfaces of the body, in order to suppress penetration of moisture and plating solution through the external electrode, the thickness of the external electrodes disposed on the third and fourth surfaces may be formed to be equal to or greater than a certain level.

The connection electrodes 231 and 232 according to the example embodiment in the present disclosure may have a more uniform and thinner thickness than the external electrode formed by the conventional dipping method.

The connection electrodes 231 and 232 may be formed, for example, by transferring a sheet including a conductive metal, an organic material such as a binder, or the like to the third and fourth surfaces, but the present disclosure is not limited thereto, and the connection electrodes 231 and 232 may be formed by plating a conductive metal on the third and fourth surfaces 3 and 4. That is, the connection electrodes 231 and 232 may be a fired layer in which the conductive metal is fired or a plating layer.

The thickness of the connection electrodes 231 and 232 is not particularly limited, but may be, for example, 2 to 7 μm. Here, the thickness of the connection electrodes 231 and 232 may mean a maximum thickness, and may mean the size of the connection electrodes 231 and 232 in the second direction.

The first and second connection electrodes 231 and 232 may include Cu. Cu has an advantage of having excellent electrical connectivity with metals included in the internal electrodes 121 and 122.

Meanwhile, the first and second connection electrodes 231 and 232 may include Cu as a main component and other metals having excellent electrical conductivity as other materials. For example, the first and second connection electrodes 231 and 232 may further include one or more of Ni, Pd, Ag, Sn, Cr, and alloys thereof.

Meanwhile, the first and second connection electrodes 231 and 232 may further include glass in order to improve the adhesion to the body 110 and to improve density.

The first and second band electrodes 241 and 242 may be disposed on the first surface 1 of the body 110. The first and second band electrodes 241 and 242 may contact the first and second connection electrodes 231 and 232, respectively, and thus, electrically connected to the first and second internal electrodes 121 and 122, respectively.

As the external electrode formed by the conventional dipping method is thickly formed on the third and fourth surfaces and partially extends to the first, second, fifth and sixth surfaces, there is a problem in that it is difficult to secure a high effective volume ratio.

On the other hand, according to an example embodiment in the present disclosure, the first and second connection electrodes 231 and 232 are disposed on the surface where the internal electrode is exposed, and the first and second band electrodes 241 and 242 are disposed on the surface mounted on the substrate, so a high effective volume ratio may be secured.

Meanwhile, when the internal electrodes 121 and 122 are stacked in the first direction, the multilayer electronic component 200 may be horizontally mounted on the substrate so that the internal electrodes 121 and 122 are parallel to the mounting surface. However, the present disclosure is not limited to the horizontal mounting, and when the internal electrodes 121 and 122 are stacked in the third direction, the multilayer electronic component may be vertically mounted on the substrate so that the internal electrodes 121 and 122 are perpendicular to the mounting surface.

The first and second band electrodes 241 and 242 may include Ag. For example, the first and second band electrodes 241 and 242 may be firing electrodes including Ag and glass, and may be formed by a method of applying a paste including Ag and glass to the first surface of the body, but the present disclosure is not limited thereto, and the first and second band electrodes 241 and 242 may be an Ag plating layer in which Ag is plated on the first surface of the body.

In an example embodiment in the present disclosure, by making the first and second band electrodes 241 and 242 include Ag, the adhesion to conductive adhesives 271 and 272 including a conductive metal and a resin may be improved, so it is possible to improve the adhesion strength between a substrate 280 and the multilayer electronic component 200.

Since the first and second band electrodes 241 and 242 include Ag having a large standard reduction potential compared to Cu included in the first and second connection electrodes 231 and 232, the first and second band electrodes 241 and 242 may serve to prevent the first and second connection electrodes 231 and 232 from being oxidized and prevent moisture from being penetrated.

In addition, since the multilayer electronic component 200 may be mounted on the substrate 280 by the conductive adhesive including a conductive metal and a resin, it is possible to solve a problem of occurrence of solder cracks due to a difference in a coefficient of thermal expansion between an external electrode and a solder in a high-temperature and low-temperature cycle.

However, when the first and second band electrodes 241 and 242 including Ag are formed on the first and second connection electrodes 231 and 232, the Ag ion migration may occur along the surface of the body 110. Accordingly, due to the leakage current of the multilayer electronic component 200, the insulation resistance may deteriorate and the short circuit may occur between the connection electrodes 231 and 232 having different polarities.

Since the Ag ion migration occurs on the surface of the body 110 between the external electrodes of the multilayer electronic component, the insulation layer on the surface of the body 110 is destroyed by the leakage current, so the insulation resistance of the multilayer electronic component 200 may be reduced and a short circuit between electrodes may occur, to thereby have a fatal influence on the reliability of the multilayer electronic component 200.

As described above, the farther away from the mounting surface of the multilayer electronic component 200, the stronger the Ag ion migration tends to occur.

Accordingly, in an example embodiment, the first and second band electrodes 241 and 242 including Ag are disposed on the first surface of the body 110, and the region of the first and second band electrodes 241 and 242 may be controlled to secure the reliability of the multilayer electronic component 200 in the high-temperature and high-humidity environment while minimizing the occurrence of the Ag ion migration.

According to an example embodiment in the present disclosure, the first and second connection electrodes 231 and 232 including Cu may be disposed on the third surface 3 and the fourth surface 4 of the body 110, respectively, to secure electrical conduction, and the first and second band electrodes 241 and 242 including Ag may be disposed on the first surface to be mounted on the substrate 280 through the conductive adhesives 271 and 272 including the conductive metal and resin.

In addition, since the first and second band electrodes 241 and 242 including Ag are disposed on the first surface, it is possible to suppress the Ag ion migration from occurring on the surface of the body 110 of the multilayer electronic component 200.

As described above, since the Ag ion migration tends to occur more strongly from the mounting surface of the multilayer electronic component 200 toward the direction opposite to the mounting surface, such an effect of suppressing the Ag ion migration may be more remarkable by disposing the first and second band electrodes 241 and 242 on the first surface.

Meanwhile, as described above, when the first and second band electrodes 241 and 242 are formed of Ag alone, when Ag is partially condensed in the band electrode, or when the content of Ag is excessive, the Ag ion migration may occur more strongly.

In an example embodiment, the first and second connection electrodes 231 and 232 may further include glass, and the first and second band electrodes 241 and 242 may further include glass and palladium (Pd).

Accordingly, both the connection electrodes 231 and 232 and the band electrodes 241 and 242 include glass to improve the adhesion, and when the first and second band electrodes 241 and 242 further include palladium (Pd), Ag and Pd may form isomorphous, so it is possible to effectively suppress the Ag ion migration. In addition, since the standard reduction potential (+0.915V) of Pd is higher than the standard reduction potential (0.80V) of Ag, it is possible to more effectively prevent the first and second connection electrodes 231 and 232 from being oxidized.

In this case, the content of Pd included in the first and second band electrodes 241 and 242 may be 1 mol or more and 5 mol or less relative to 100 mol of Ag.

When the content of Pd is less than 1 mol relative to 100 mol of Ag, it is difficult to sufficiently form the isomorphous with Ag, so the effect of suppressing the Ag ion migration may be insufficient.

On the other hand, when the content of Pd is more than 5 moles relative to 100 moles of Ag, since a driving force for sintering of Pd is generally higher than that of Ag, blisters, radiation cracks, and the like may occur due to the difference in the driving forces for sintering, so the manufacturing cost may be increased.

In an example embodiment, the first connection electrode 231 may include a first connection portion 231a that is disposed on the third surface 3 and is connected to the first internal electrode 121 and a first corner portion 231b that is disposed to extend from the first connection portion 231a to a corner C1 connecting the first surface 1 and the third surface 3, the second connection electrode 232 may include a second connection portion 232a that is disposed on the fourth surface 4 and connected to the second internal electrode 122 and a second corner portion 232b that is disposed to extend from the second connection portion 232a to a corner C2 connecting the first surface 1 and the fourth surface 4, the first band electrode 241 may be disposed to extend to cover at least a portion of the first corner portion 231b, and the second band electrode 242 may be disposed to extend to cover at least a portion of the second corner portion 232b. Accordingly, the first and second connection electrodes 231 and 232 connected to the internal electrodes 121 and 122 may be connected to the first and second band electrodes 241 and 242, respectively, to secure electrical conduction and minimize the region in which the first and second band electrodes 241 and 242 including Ag are disposed, so the Ag ion migration may be effectively suppressed.

Referring to FIG. 14, in the substrate 2000 on which the multilayer electronic component 200 according to an example embodiment in the present disclosure is mounted, the first and second electrode layers 241 and 242 of the multilayer electronic component 200 may be bonded to electrode pads 291 and 292 disposed on the substrate 280 by the conductive adhesives 271 and 272.

Since the first and second band electrodes 241 and 242 include Ag, the band electrodes 241 and 242 and the conductive adhesives 271 and 272 may secure electrical conduction, and the resin included in the conductive adhesives 271 and 272 may be cured to secure the adhesion to the substrate 280.

In addition, unlike the conventional case of mounting the multilayer electronic components on the substrate using solder including tin (Sn), by alleviating the thermal shock applied to the electrode layers 241 and 242 and the conductive adhesives 271 and 272 even in the high-temperature cycle, it is possible to improve the adhesion strength of the multilayer electronic component 200.

The components and effects of the conductive adhesives 271 and 272 of the substrate 2000 on which the multilayer electronic component 200 according to the example embodiment in the present disclosure is mounted may be the same as the conductive adhesives 171 and 172 used for the substrate 1000 on which the multilayer electronic component 100 according to the example embodiment in the present disclosure is mounted.

Figure 15:
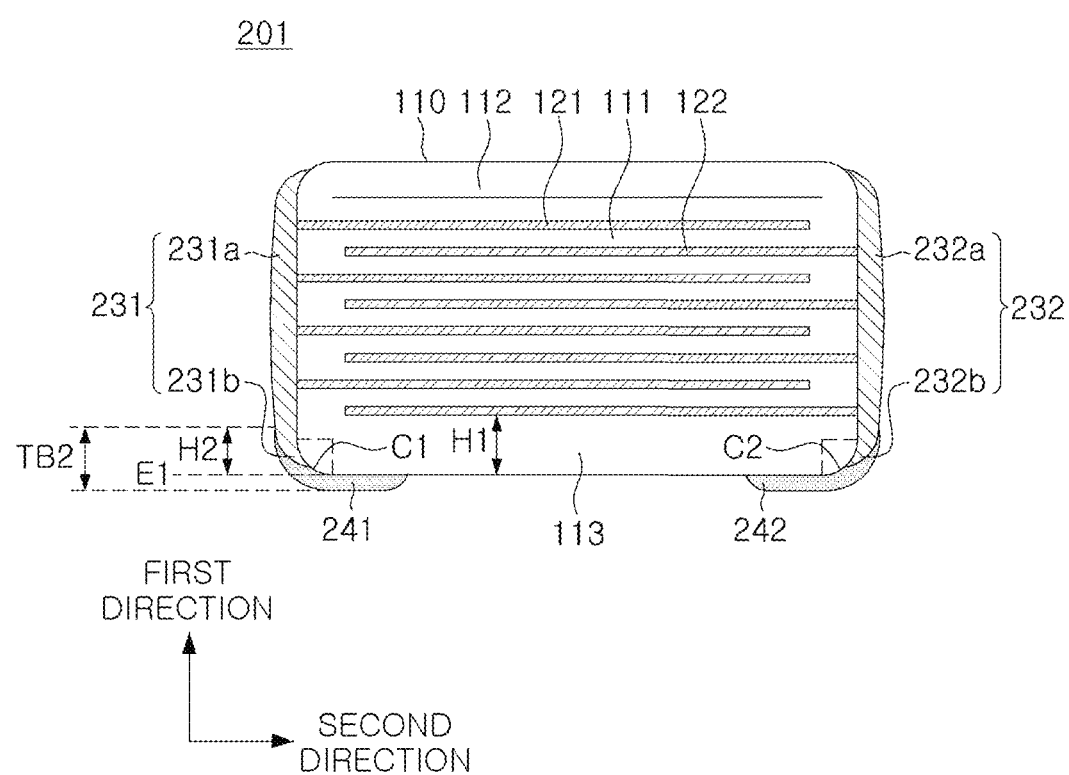
FIG. 15 is a cross-sectional view illustrating the multilayer electronic component according to the example embodiment in the present disclosure.

FIG. 15 is a cross-sectional view illustrating a multilayer electronic component 201 according to the example embodiment.

When the multilayer electronic component 201 is mounted through the conductive adhesives 271 and 272 including a conductive metal and a resin, it is necessary to sufficiently secure the contact area between the conductive adhesives 271 and 272 and the first and second electrode layers 241 and 242 to secure the adhesion strength.

Referring to FIG. 15, the first band electrode 241 of the multilayer electronic component 201 according to an example embodiment may be disposed to extend to cover at least a portion of the first connection portion 231a, and the second band electrode 242 may be disposed to extend to cover at least a portion of the second connection portion 232a. Accordingly, the adhesion strength of the multilayer electronic component 201 may be improved by sufficiently securing the contact area between the conductive adhesives 271 and 272 and the first and second band electrodes 241 and In an example embodiment, an average size TB2 of the first and second band electrodes 241 and 142 in the first direction from the lowest point in the first direction to the highest point in the first direction may be 10 μm or more and 40 μm or less. When the TB2 is less than 10 μm, the first and second band electrodes 241 and 242 may not sufficiently cover the first and second corner portions 231b and 232b, so it may be difficult to sufficiently secure the electrical connectivity, and when the TB2 exceeds 40 μm, the first and second band electrodes 241 and 242 are excessively formed on the first and second connection portions 231a and 232a, so it may be difficult to suppress the occurrence of the Ag ion migration.

From a similar point of view, in an example embodiment, when an average size in the first direction from the first surface 1 to the internal electrode disposed closest to the first surface 1 among the first and second internal electrodes 121 and 122 is H1 and an average size in the first direction from an extension line E1 of the first surface to ends of the first and second band electrodes 241 and 242 disposed on the first and second connection portions 231a and 232a is H2, H1≥H2 may be satisfied. That is, since the first and second band electrodes 241 and 242 are disposed in a region below the first and second internal electrodes 121 and 122 disposed at a lowermost end, it is possible to effectively suppress the Ag ion migration while sufficiently securing the electrical connectivity.

Meanwhile, the average size TB2 in the first direction, from a lowest point of the first and second band electrodes 241 and 242 to the highest point of the first and second band electrodes 241 and 242 in the first direction may be a value obtained by averaging values measured on a side of the first band electrode 241 and values measured on a side of the second band electrode 242, in a cross-section (an L-T plane) taken in a central portion of the body 110 in the third direction, in the first and second directions.

Figure 16:
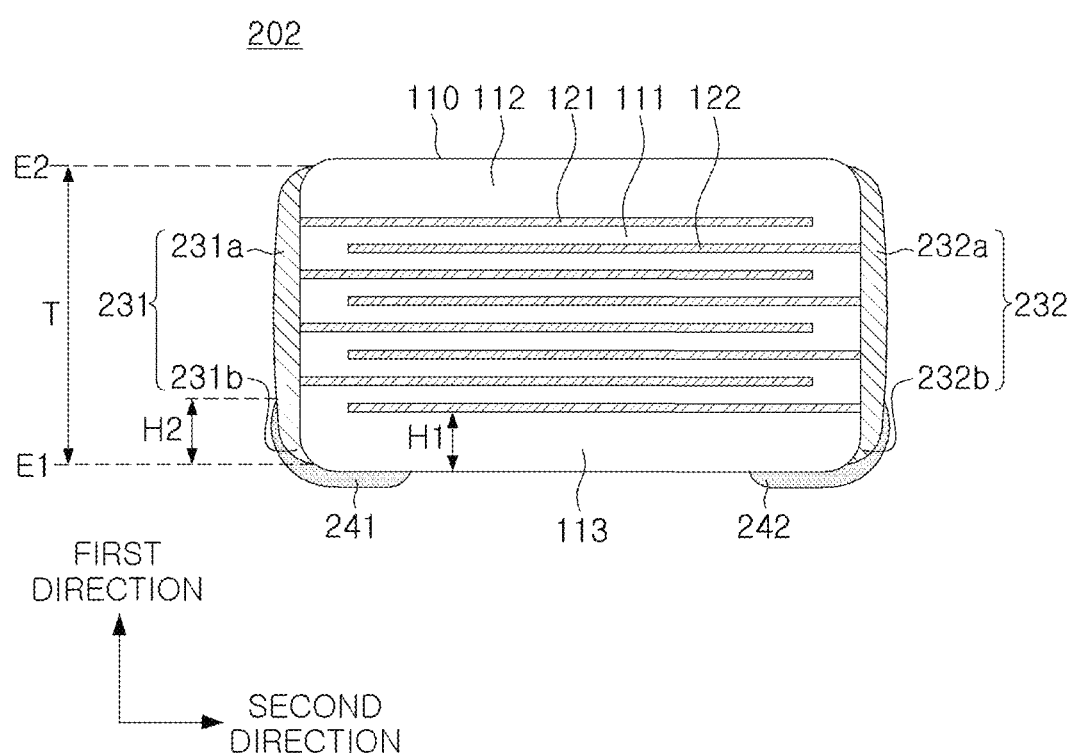
FIG. 16 is a cross-sectional view illustrating the multilayer electronic component according to the example embodiment in the present disclosure.

FIG. 16 is a cross-sectional view illustrating a multilayer electronic component 202 according to the example embodiment.

Referring to FIG. 16, in the multilayer electronic component 202 according to an example embodiment, when an average size in the first direction from the first surface 1 to the internal electrode disposed closest to the first surface 1 among the first and second internal electrodes 121 and 122 is H1 and an average size in the first direction from the extension line E1 of the first surface to the ends of the first and second band electrodes 241 and 242 disposed on the first and second connection portions 231a and 232a is H2, H1<H2 may be satisfied.

As described above, since the corner of the body 110 is a region where contraction occurs during the firing process, the dielectric microstructure is not dense, and thus, the corner of the body 110 may serve as a main path for moisture penetration. According to the multilayer electronic component 202 according to the example embodiment, by disposing the first and second band electrodes 241 and 242 above the internal electrode located at the lowermost end among the first and second internal electrodes 121 and 122, it is possible to more reliably prevent the moisture penetration through the corner of the body, so it is possible to improve the moisture resistance reliability of the multilayer electronic component 202.

Meanwhile, as described above, the Ag ion migration tends to occur more strongly from the mounting surface of the multilayer electronic component 202 toward the direction opposite to the mounting surface. Accordingly, when the first and second electrode layers 241 and 242 including Ag are formed to further extend in the first direction of the body 110, the effect of suppressing the occurrence of the Ag ion migration by disposing the first and second band electrodes 241 and 242 on the first surface of the body 110 may not be sufficient. In this case, when the average size of the body in the first direction is T, the first and second band electrodes 241 and 242 including Ag are not excessively formed in the first direction by satisfying H2<T/2, so the effect of suppressing the occurrence of the Ag ion migration may be sufficiently secured. That is, the H1, H2, and T may satisfy H1<H2<T/2.

H1 and H2 may be values obtained by averaging values measured in a cross-section (an L-T plane) taken in a central portion of the body 110 in the third direction, in the first and second directions. H1 may be a value obtained by averaging distances between an internal electrode disposed closest to the first surface 1 and the first surface 1 in the cross-section at any point in the second direction, and H2 may be a value measured based on a distal end of an electrode layer disposed in a connection portion, and may be a value obtained by averaging a value measured on a side of the first band portion 241 and a value measured on a side of the second band portion 242. In this case, an extension line E1 of the first surface serving as a reference when measuring H1 and H2 may be the same.

Figure 17:
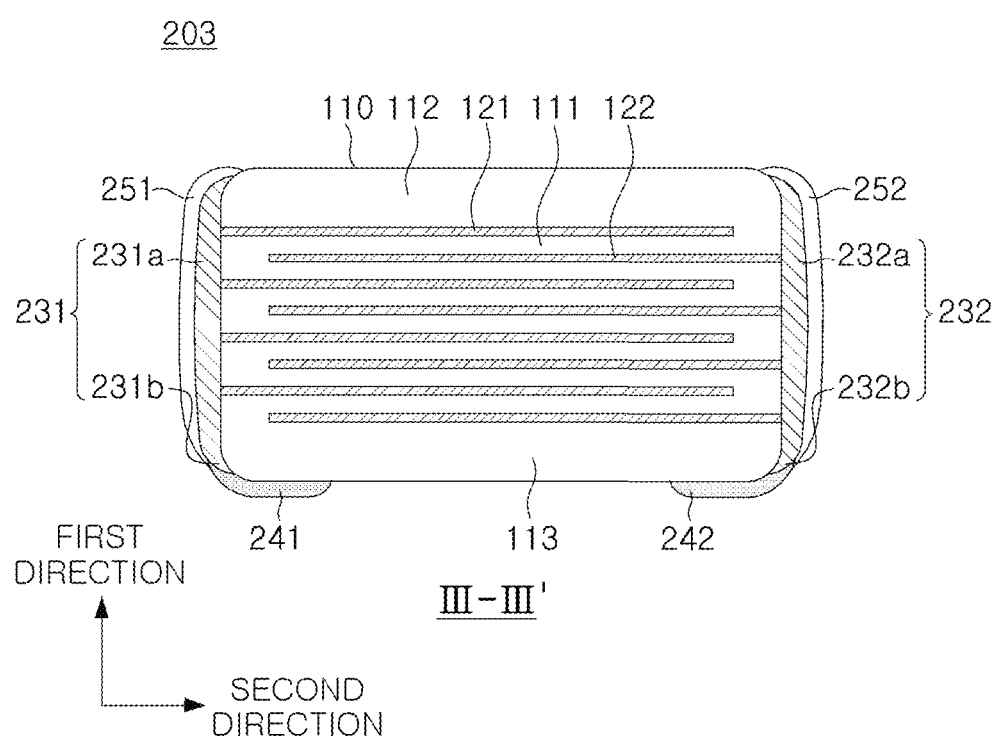
FIG. 17 is a cross-sectional view illustrating the multilayer electronic component according to the example embodiment in the present disclosure.

FIG. 17 is a cross-sectional view illustrating a multilayer electronic component 203 according to the example embodiment.

Referring to FIG. 17, the multilayer electronic component 203 according to the example embodiment may include a first insulating layer 251 disposed on the first connection electrode 231 and a second insulating layer 252 disposed on the second connection electrode 232.

The first and second insulating layers 251 and 252 may be disposed on the first and second connection electrodes 231 and 232 to serve to prevent oxidation of Cu included in the first and second connection electrodes 231 and 232 and improve the flexural strength of the multilayer electronic component 203.

The first insulating layer 251 may be disposed on the first connection portion 231a to contact the first band electrode 241, and the second insulating layer 252 may be disposed on the second connection portion 232a to contact the second band electrode 242. Accordingly, it is possible to further improve the flexural strength and sealing characteristics of the multilayer electronic component 203. In order to significantly improve the sealing characteristics of the multilayer electronic component 203, the first and second insulating layers 251 and 252 are preferably disposed to extend to a portion of the second surface 2, but are not limited thereto.

Meanwhile, the components and the formation method of the first and second insulating layers 251 and 252 may be the same as the first and second insulating layers 151 and 152 of the multilayer electronic component 102 according to the above-described an example embodiment.

Figure 18:
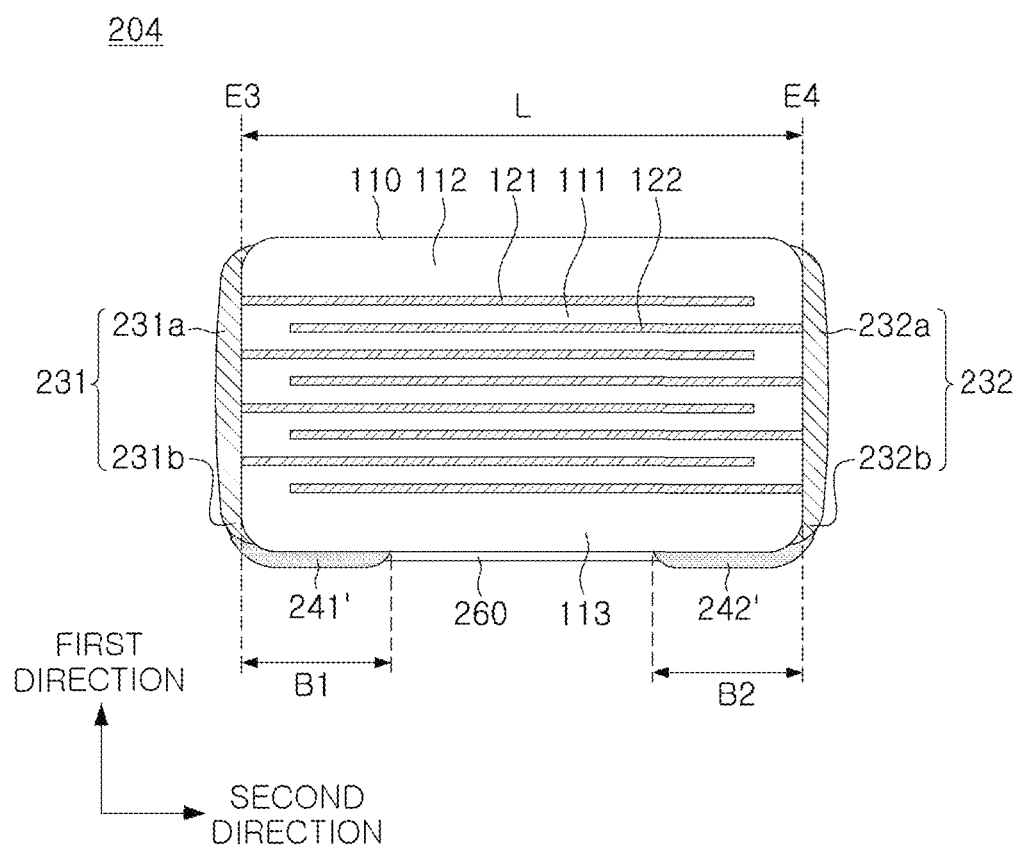
FIG. 18 is a cross-sectional view illustrating the multilayer electronic component according to the example embodiment in the present disclosure.

FIG. 18 is a cross-sectional view illustrating a multilayer electronic component 204 according to the example embodiment.

Referring to FIG. 18, in the multilayer electronic component 204 according to the example embodiment, when the average size of the body in the second direction is L, the average size of the body 110 in the second direction from the extension line E3 of the third surface 3 to the end of the first electrode layer 241' is B1, and the average size of the body in the second direction from the extension line of the fourth surface 4 to the end of the second electrode layer 242' is B2, $0.2 \leq B1/L \leq 0.4$ and $0.2 \leq B2/L \leq 0.4$ may be satisfied.

When B1/L and B2/L are less than 0.2, it may be difficult to sufficiently secure the adhesion strength. On the other hand, when B2/L exceeds 0.4, there may be a risk that the leakage current is generated between the first electrode layer 241 and the second electrode layer 242 under the high-voltage current, and the first electrode layer 241 and the second electrode 242 are electrically connected by the spreading of the conductive adhesive or the like during the mounting.

B1, B2, and L may be values measured in a cross-section (an L-T plane) taken in a central portion of the body 110 in the third direction, in the first and second directions. In particular, a magnitude L in the second direction of the body 110 may correspond to a magnitude in the second direction between an extension line E3 of the third surface and an extension line E4 of the fourth surface.

Referring to FIG. 18, the multilayer electronic component 204 according to the example embodiment may further include an additional insulating layer 260 that is disposed on the first surface 1 but disposed between the first electrode layer 241 and the second electrode layer 242. Accordingly, it is possible to prevent the leakage current or the like that may occur between the first electrode layer 241 and the second electrode layer 242 under the high-voltage current.

Figure 19:
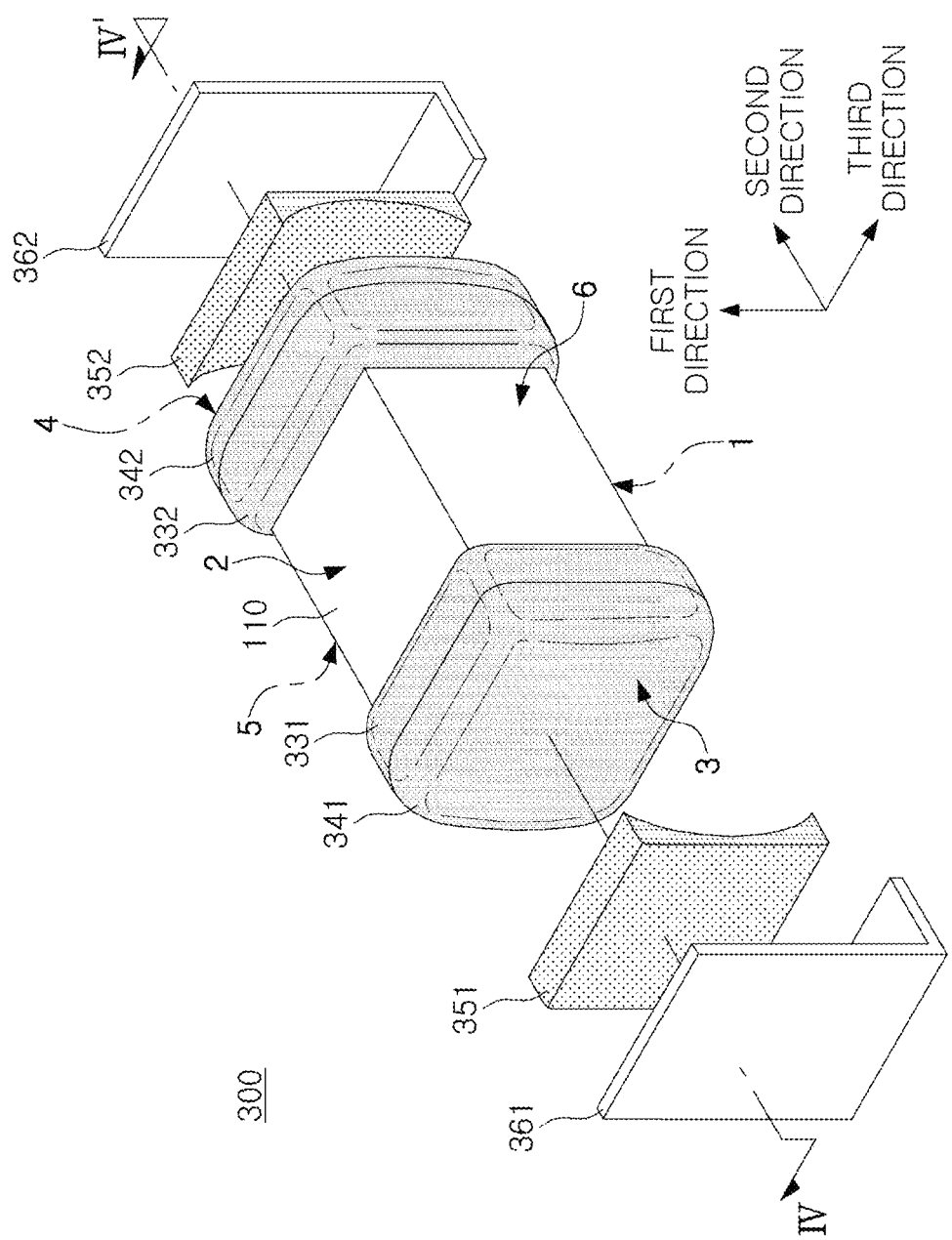
FIG. 19 is an exploded perspective view illustrating the multilayer electronic component according to the example embodiment in the present disclosure.

FIG. 19 is an exploded perspective view illustrating a multilayer electronic component 300 according to the example embodiment in the present disclosure.

Figure 20:
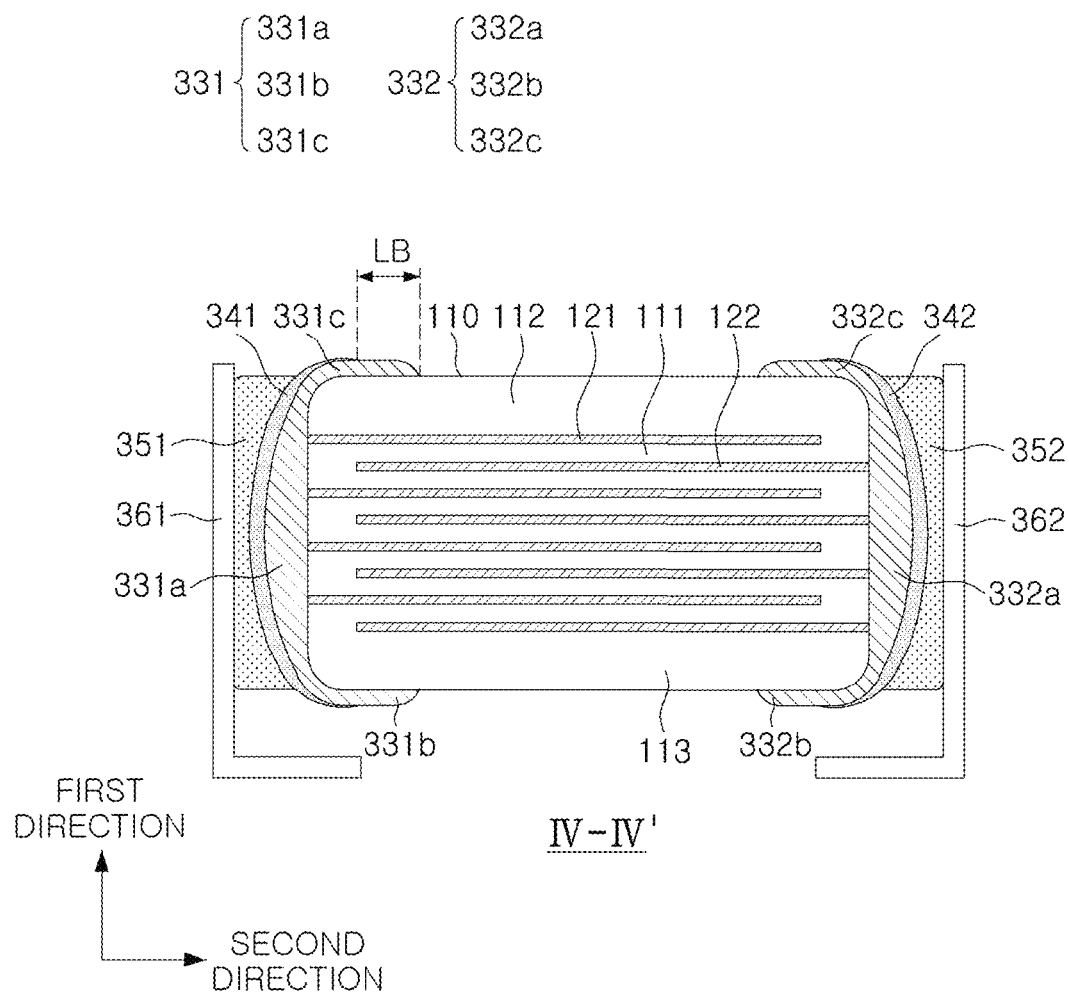
FIG. 20 is a cross-sectional view taken along line IV-IV' of FIG. 19.

FIG. 20 is a cross-sectional view taken along line IV-IV' of FIG. 19.

Figure 21:
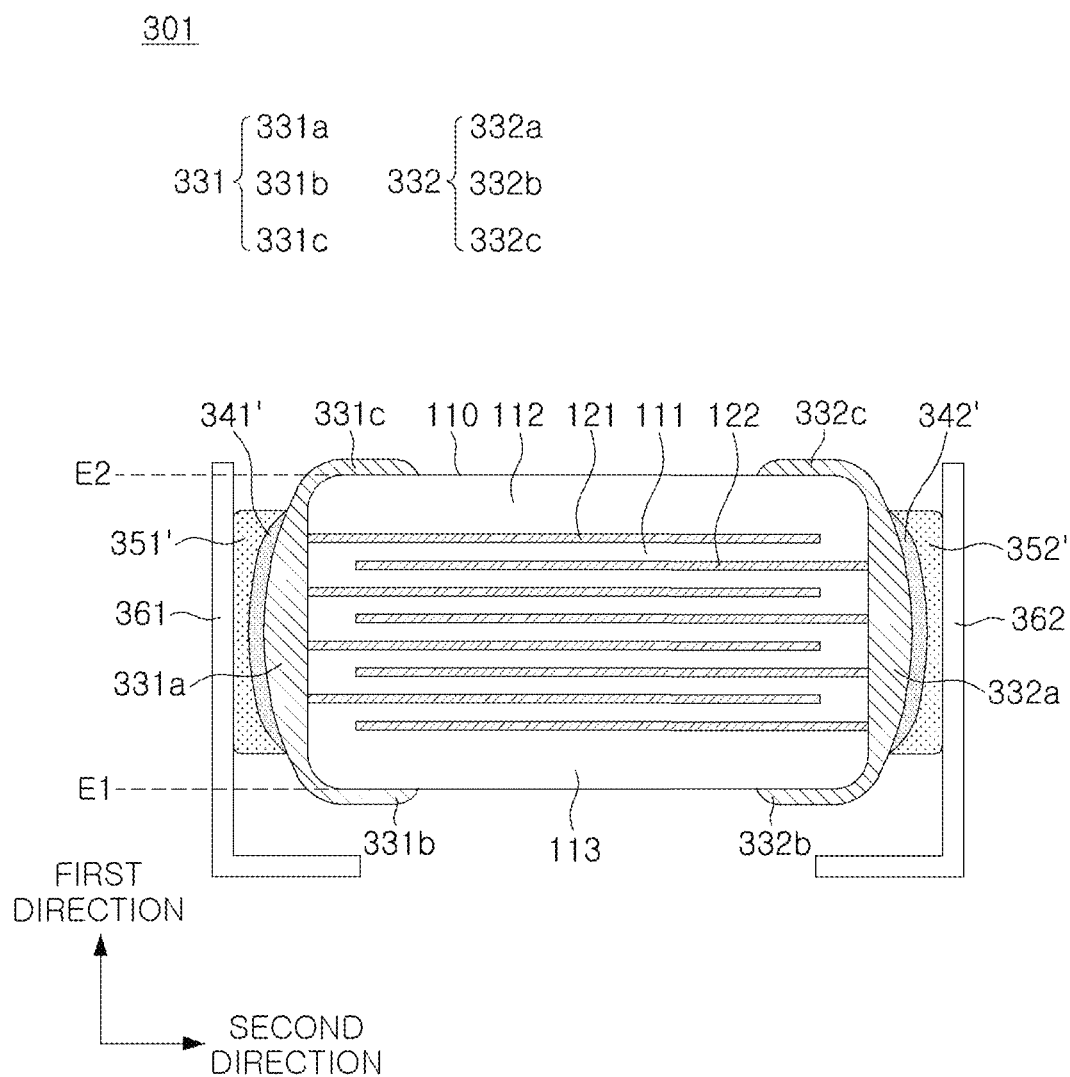
FIG. 21 is a cross-sectional view illustrating the multilayer electronic component according to the example embodiment in the present disclosure.

FIG. 21 is a cross-sectional view illustrating a multilayer electronic component 301 according to the example embodiment.

Figure 22:
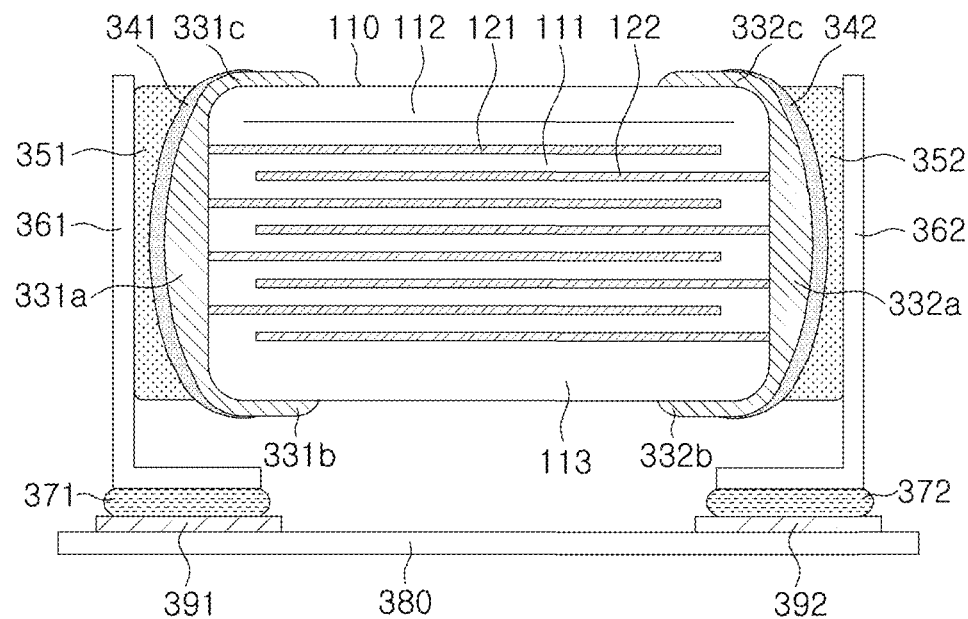
FIG. 22 is a schematic cross-sectional view of a substrate on which the multilayer electronic component according to the example embodiment in the present disclosure is mounted.

FIG. 22 schematically illustrates a cross-sectional view of a substrate 3000 on which the multilayer electronic component according to the example embodiment in the present disclosure is mounted.

Hereinafter, the multilayer electronic component 300 according to the example embodiment in the present disclosure and the multilayer electronic component 301 according to an example embodiment will be described with reference to FIGS. 19 to 22. However, contents overlapping with the multilayer electronic components 100, 101, 102, 103, and 104 according to an example embodiment and various example embodiments in the present disclosure may be omitted to avoid a duplicate description.

Referring to FIGS. 19 and 20, the multilayer electronic component 300 according to an example embodiment in the present disclosure, may include: a body 110 including a dielectric layer 111, first and second internal electrodes 121 and 122, alternately disposed with the dielectric layer 111 disposed therebetween, first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1 and 2 and opposing each other in a third direction; a first base electrode layer 331 including a first connection portion 331a disposed on the third surface 3 and connected to the first internal electrode 121, a first band portion 331b disposed to extend from the first connection portion 331a to a portion of the first surface 1, and a third band portion 331c disposed to extend from the first connection portion 331a to a portion of the second surface 2; a second base electrode layer 332 including a second connection portion 332a disposed on the fourth surface 4 and connected to the second internal electrode 122, a second band portion 332b disposed to extend from the second connection portion 332a to a portion of the first surface 1, and a fourth band portion 332c disposed to extend from the second connection portion 332a to a portion of the second surface 2; a first electrode layer 341 disposed on the first connection portion 331a; a second electrode layer 342 disposed on the second connection portion 332a; a first metal frame 361 disposed on the first electrode layer 331; a second metal frame 362 disposed on the second electrode layer 332; and conductive connection portions 351 and 352 each disposed between the first electrode layer 341 and the first metal frame 361 and between the second electrode layer 342 and the second metal frame 362, in which the first and second base electrode layers 331 and 332 may include Cu, and the first and second electrode layers 341 and 342 may include Ag.

The first base electrode layer 331 may include a first connection portion 331a that is disposed on the third surface 3 and is connected to the first internal electrode 121, a first band portion 131b that is disposed to extend from the first connection portion 331a to a portion of the first surface 1, and a third band portion 331c that is disposed to extend from the first connection portion 331a to a portion of the second surface 2, and the second base electrode layer 332 may include a second connection portion 332a that is disposed on the fourth surface 4 and is connected to the second internal electrode 122, a second band portion 332b that is disposed to extend from the second connection portion 332a to a portion of the first surface 1, and a fourth band portion 332c that is disposed to extend from the second connection portion 332a to a portion of the second surface 2.

In addition, the first base electrode layer 331 may include a first side band portion extending from the first connection portion 331a to a portion of the fifth and sixth surfaces 5 and 6, and the second base electrode layer 332 may include a second side band portion extending from the second connection portion 332a to a portion of the fifth and sixth surfaces.

However, the third band portion, the fourth band portion, the first side band portion, and the second side band portion may not be essential components of the present disclosure. That is, the first base electrode layer 331 may include the first connection portion 331a and the first band portion 131b, and the second base electrode layer 132 may include the second connection portion 332a and the second band portion 132b, and the first and second base electrode layers 332 and 332 may not be disposed on the second surface 2, and may also be disposed on the fifth surface 5 and the sixth surface 6.

The first and second base electrode layers 331 and 332 may include Cu. Cu has an advantage of having excellent electrical connectivity with metals included in the internal electrodes 121 and 122.

Meanwhile, the first and second base electrode layers 331 and 332 may include Cu as a main component and other metals having excellent electrical conductivity as other materials. For example, the first and second base electrode layers 331 and 332 may further include one or more of Ni, Pd, Ag, Sn, Cr, and alloys thereof.

The first and second base electrode layers 331 and 332 may be firing electrodes including Cu and glass, or resin-based electrodes including Cu and resin.

In addition, the first and second base electrode layers 331 and 332 may be in a form in which the firing electrode and the resin-based electrode are sequentially formed on the body. In addition, the first and second base electrode layers 331 and 332 may be formed by transferring a sheet including Cu onto the body or by transferring the sheet including Cu onto the firing electrode.

According to an example embodiment in the present disclosure, the first and second base electrode layers 331 and 332 may include Cu, to thereby improve electrical connectivity with the internal electrodes 121 and 122. Meanwhile, the first and second base electrode layers 331 and 332 may further include glass in order to improve the adhesion to the body 110 and to improve density.

The first and second electrode layers 341 and 342 are disposed on the first and second connection portions 331a and 332a, respectively. The first electrode layer 341 may be disposed on the first connection portion 331a and the second electrode layer 342 may be disposed on the second connection portion 332a and may include silver (Ag). Accordingly, even if the first and second base electrode layers include Cu, it is possible to prevent Cu from being oxidized by blocking the external exposure of the first and second connection portions 331a and 332a.

In the related art, an attempt has been made to form an electrode layer including Ag on a base electrode layer including Cu in order to secure the reliability of the multilayer electronic component in the high temperature and high pressure. In this case, the Ag ion migration may occur along the surface of the body 110 due to external moisture, which may cause the deterioration in insulation resistance and a short circuit between the external electrodes due to the leakage current.

In particular, such Ag ion migration mainly occurs in a region adjacent to the end of the band portion of the external electrode in which the electrode layer including Ag contacts the surface of the body 110. In addition, since the multilayer electronic component 300 is mounted on the substrate 380 through the metal frames 361 and 362, unlike the case where the multilayer electronic component is mounted on the substrate without the metal frame, the mounting surface of the body is easily exposed to the external environment, so the Ag ion migration may easily occur on the mounting surface of the body.

Accordingly, in an example embodiment in the present disclosure, the disposition region of the first and second electrode layers 341 and 342 disposed on the connection portions 331a and 332a is controlled, and an appropriate distance from the band portions 331b, 331c, 332b, and 332c is maintained to suppress the occurrence of Ag ion migration.

According to an example embodiment in the present disclosure, the first and second electrode layers 341 and 342 including Ag may be disposed on the first and second connection portions 331a and 332a of the first and second base electrode layers 331 and 332 including Cu, respectively, to effectively suppress the occurrence of the Ag ion migration while preventing the oxidation of the connection portions 331a and 332a, so it is possible to suppress the deterioration in the insulation resistance and the occurrence of the short circuit of the multilayer electronic component 300.

When the first and second electrode layers 341 and 342 including Ag are disposed on the connection portions 331a and 332a, and the conductive adhesive is formed on the band portions 331b, 331c, 332b, 332c for mounting the substrate, the adhesion strength may be decreased during the mounting due to the oxidation of Cu included in the regions of the band portions 331b, 331c, 332b, and 332c that are not covered with the first and second electrode layers 341 and 342.

In an example embodiment in the present disclosure, by disposing the first metal frame 361 on the first electrode layer 341 and disposing the second metal frame 362 on the second electrode layer 342, the metal frames 361 and 362 may adhere to the electrode pads 391 and 392 of the substrate through the conductive adhesives 371 and 372 to prevent the decrease in adhesion strength due to the oxidation of the band portion.

In an example embodiment, the first and second electrode layers 341 and 342 may further include one or more of palladium (Pd), platinum (Pt), and gold (Au). Accordingly, the occurrence of the Ag ion migration may be further suppressed compared to the case where the first and second electrode layers 341 and 342 include only silver (Ag).

In an example embodiment, the first and second base electrode layers 331 and 332 may further include glass, and the first and second electrode layers 341 and 342 may further include glass and palladium (Pd).

Accordingly, both the base electrode layers 331 and 332 and the electrode layers 341 and 342 include glass to improve the adhesion, and when the first and second electrode layers 341 and 342 further include palladium (Pd), Ag and Pd may form isomorphous, so it is possible to effectively suppress the Ag ion migration. In addition, since the standard reduction potential (+0.915V) of Pd is higher than the standard reduction potential (0.80V) of Ag, it is possible to more effectively prevent the first and second base electrode layers 331 and 332 from being oxidized.

In this case, the content of Pd included in the first and second electrode layers 341 and 342 may be 1 mol or more and 5 mol or less relative to 100 mol of Ag.

When the content of Pd is less than 1 mol relative to 100 mol of Ag, it is difficult to sufficiently form the isomorphous with Ag, so the effect of suppressing the Ag ion migration may be insufficient.

On the other hand, when the content of Pd is more than 5 moles relative to 100 moles of Ag, since a driving force for sintering of Pd is generally higher than that of Ag, blisters, radiation cracks, and the like may occur due to the difference in the driving forces for sintering, so the manufacturing cost may be increased.

The metal frames 361 and 362 may serve to prevent the thermal and mechanical stress from the substrate from being directly transferred to the multilayer ceramic capacitor by securing a gap between the multilayer electronic component 300 and the mounting substrate 380. In particular, since the multilayer electronic component 300 such as the example embodiment in the present disclosure including the electrode layer including Ag may be used in the high-temperature, high-pressure and high-vibration environment, the effect may be more remarkable.

The first metal frame 361 may be disposed on the first electrode layer 341, and the second metal frame 362 may be disposed on the second electrode layer 342. In the multilayer electronic component 300 according to the example embodiment in the present disclosure, the first and second metal frames 361 and 362 may contact the electrode pads 391 and 392 disposed on the substrate 380 through the conductive adhesives 371 and 372 to form the substrate 3000 on which the multilayer electronic component 300 is mounted.

The material forming the metal frames 361 and 362 is not particularly limited as long as it is a material capable of absorbing an external shock and strongly supporting the multilayer electronic component 300. In an example embodiment, the first and second metal frames may include one or more of Ni, Fe, Cu, Ag, Cr, and alloys thereof.

The conductive connection portion 351 and 352 may be disposed between the first electrode layer 341 and the first metal frame 361 and between the second electrode layer 342 and the second metal frame 362, and serve to improve the adhesion between the electrode layer and the metal frame.

The conductive connection portions 351 and 352 may include a conductive material to secure the electrical connectivity, and may include a resin to absorb vibration transmitted from the outside, and secure the adhesion between the electrode layers 341 and 342 and the metal frames 361 and 362.

More preferably, Ag may be included as the conductive material to further improve the electrical connectivity with the electrode layers 341 and 342 including Ag, and the resistance due to the thermal shock may be improved by including an epoxy resin as a resin.

In an example embodiment, the first electrode layer 341 may be disposed to extend from the first connection portion 331a to a portion on the first and third band portions 331b and 331c, and the second electrode layer 342 may be disposed to extend from the second connection portion 332a to a portion on the second and fourth band portions 332b and 332c. Accordingly, the electrode layer including Ag may be disposed to cover the corner of the body vulnerable to the penetration of moisture from the outside, to thereby improve the moisture resistance reliability of the multilayer electronic component 300.

Meanwhile, when the first and second electrode layers 341 and 342 include side band portions extending from the first and second connection portions 341a and 342a to a portion on the fifth and sixth surfaces, the first and second electrode layers 341 and 242 may be disposed to extend to a portion on the side band portion, to thereby further improve the moisture resistance reliability of the multilayer electronic component 300.

Meanwhile, when the first and second electrode layers 341 and 342 are disposed to cover the band portions 331b, 331c, 332b, and 332c of the base electrode layers 331 and 332, the first and second electrode layers 341 and 342 may contact the surface of the body 110. When the multilayer electronic component 300 is operated in the high-temperature and high-humidity state, since the possibility that the surface of the body 110 is condensed may be increased, there is a risk of accelerating the Ag ion migration when the first and second electrode layers 341 and 342 including Ag contact the surface of the body 110.

Accordingly, in an example embodiment, the first electrode layer 341 may be disposed so as not to cover the ends of the first and third band portions 331b and 331c, and the second electrode layer 341 may be disposed so as not to cover the second and fourth band portions 332b and 332c, to thereby suppress a phenomenon in which the Ag ion migration is accelerated.

In an example embodiment, an average size LB in the second direction, ranging from an end on which the first electrode layer 341 and the conductive connection portion 351 meet to ends of the first and third band portions 331b and 331c, and an average size LB in the second direction, ranging from an end on which the second electrode layer 342 and the conductive connection portion 252 meet to ends of the second and fourth band portions 332b and 332c may be 0.1 μm or more and 0.58 μm or less. When the LB is less than 0.1 μm, it may not sufficiently cover the corner of the body vulnerable to the penetration of moisture from the outside, so it may be difficult to sufficiently secure the moisture resistance reliability, and when the LB exceeds 0.58 μm, the distance between the body 110 and the first and second electrode layers 341 and 342 is close, so it may be difficult to suppress the acceleration of the Ag ion migration. According to an example embodiment, by appropriately controlling the average length in the second direction between the band portions 331b, 331c, 332b, and 332c of the base electrode layer from the ends of the electrode layers 341 and 342, it is possible to suppress the phenomenon in which the Ag ion migration is accelerated while securing the sufficient moisture resistance reliability of the multilayer electronic component 300.

An average size LB in the second direction, ranging from an end on which the first electrode layer 341 and the conductive connection portion 351 meet to ends of the first and third band portions 331b and 331c, and an average size LB in the second direction, ranging from an end on which the second electrode layer 342 and the conductive connection portion 252 meets to ends of the second and fourth band portions 332b and 332c may be a value measured in a cross-section (an L-T plane) taken in a central portion of the body 110 in the third direction, in the first and second directions, and may be a value obtained by averaging values measured on a side of the first base electrode layer 331 and values measured on a side of the second base electrode layer 332.

Referring to FIG. 21, the first electrode layer 341' of the multilayer electronic component 301 according to the example embodiment may be disposed between the extension line E1 of the first surface 1 and the extension line E2 of the second surface 2. Accordingly, by not disposing the first and second electrode layers 341' and 342' including Ag on the band portions 331b, 331c, 332b, and 332c of the base electrode layers 331 and 332, the sufficient distance between the first and second electrode layers 341' and 342' and the body 110 is secured, so it is possible to more efficiently suppress the occurrence of the Ag ion migration.

In this case, the conductive adhesives 351' and 352' disposed between the first electrode layer 341' and the first metal frame 261 and between the second electrode layer 342' and the second metal frame 262 may also be disposed between the extension line E1 of the first surface 1 and the extension line E2 of the second surface 2. Accordingly, since the conductive adhesives 351' and 352' may be applied to a minimum, the Ag migration may be more reliably suppressed, and the manufacturing costs may be reduced.

Referring to FIG. 22, in the substrate 3000 on which the multilayer electronic component 300 according to an example embodiment in the present disclosure is mounted, the first and second metal frames 361 and 362 of the multilayer electronic component 300 may be bonded to the electrode pads 391 and 392 disposed on the substrate 380 by the conductive adhesives 371 and 372.

Since the first and second metal frames and the conductive adhesives 371 and 372 include the conductive metal, the electrical conduction may be secured, and the resin included in the conductive adhesives 371 and 372 may be cured to secure the adhesion to the electrode pads 391 and 392.

In addition, unlike the conventional case of mounting the multilayer electronic components on the substrate using solder including tin (Sn), by alleviating the thermal shock applied to the first and second metal frames 361 and 362 and the conductive adhesives 371 and 372 even in the high-temperature cycle, it is possible to improve the adhesion strength of the multilayer electronic component 300.

As set forth above, one of various effects in the present disclosure is to suppress the occurrence of Ag ion migration by minimizing a region in which an electrode layer including Ag is disposed.

One of various effects in the present disclosure is to suppress the occurrence of Ag ion migration by disposing an electrode layer including Ag to be biased toward a mounting surface of a multilayer electronic component.

One of several effects in the present disclosure is to suppress the occurrence of Ag ion migration by disposing an electrode layer including Ag so as not to contact a body.

However, various and beneficial advantages and effects in the present disclosure are not limited to the above description, and may be more easily understood in the course of describing the specific example embodiments in the present disclosure.

Although the example embodiments have been described in detail above, the present disclosure may not be limited to the above-described example embodiments and the accompanying drawings, but is intended to be limited to the appended claims. Accordingly, various types of substitutions, modifications and changes will be possible by those of ordinary skill in the art without departing from the present disclosure described in the claims, and belong to the scope of the present disclosure.

The term "an example embodiment" used herein does not refer to the same example embodiment, and is provided to emphasize a particular feature or characteristic different from that of another example embodiment. However, example embodiments provided herein are considered to be able to be implemented by being combined with another example embodiment. For example, even if matters described in a particular example embodiment are not described in another example embodiment, these matters may be understood as a description related to another example embodiment, unless an opposite or contradictory description is provided in another example embodiment.

Terms used herein are used only in order to describe an example embodiment rather than limiting the present disclosure. In this case, singular forms include plural forms unless interpreted otherwise in context.

What is claimed is:
1. A multilayer electronic component, comprising:
   a body including a dielectric layer, first and second internal electrodes, alternately disposed with the dielectric layer disposed therebetween, first and second surfaces opposing each other in a first direction, third and fourth surfaces connected to the first and second surfaces and opposing each other in a second direction, and fifth and sixth surfaces connected to the first to fourth surfaces and opposing each other in a third direction;
   a first base electrode layer disposed on the third surface and including a first connection portion connected to the first internal electrode;
   a second base electrode layer disposed on the fourth surface and including a second connection portion connected to the second internal electrode;
   a first electrode layer disposed on a region including the third surface and the first surface, and formed to expose at least a portion of the first connection portion; and a second electrode layer disposed on a region including the fourth surface and the first surface, and formed to expose at least a portion of the second connection portion, wherein the first and second base electrode layers include Cu, and the first and second electrode layers include Ag, and wherein an outermost portion of at least one of the first base electrode layer or the second base electrode layer in the second direction is outward of a portion of the first electrode layer disposed on the third surface or a portion of the second electrode layer disposed on the fourth surface, respectively, or wherein a portion of the first electrode layer or second electrode layer extending from the first surface to respectively the third or fourth surface has a decreasing thickness.

2. The multilayer electronic component of claim 1, wherein the first base electrode layer further comprises a first band portion disposed to extend from the first connection portion to a portion of the first surface, and a third band portion disposed to extend from the first connection portion to a portion of the second surface, the second base electrode layer further comprises a second band portion disposed to extend from the second connection portion to a portion of the first surface, and a fourth band portion disposed to extend from the second connection portion to a portion of the second surface, the first electrode layer is disposed on the first band portion, and the second electrode layer is disposed on the second band portion.

3. The multilayer electronic component of claim 2, wherein the first electrode layer extends from the first band portion to a portion of the first connection portion, and the second electrode layer extends from the second band portion to a portion of the second connection portion.

4. The multilayer electronic component of claim 3, wherein an average size of the first and second electrode layers from a lowest point in the first direction to a highest point in the first direction is 10 μm or more and 40 μm or less.

5. The multilayer electronic component of claim 3, wherein H1≥H2 is satisfied, in which H1 is an average size in the first direction from the first surface to an internal electrode disposed closest to the first surface among the first and second internal electrodes and H2 is an average size in the first direction from an extension line of the first surface to ends of the first and second electrode layers disposed on the first and second connection portions.

6. The multilayer electronic component of claim 3, wherein H1<H2 is satisfied, in which H1 is an average size in the first direction from the first surface to an internal electrode disposed closest to the first surface among the first and second internal electrodes and H2 is an average size in the first direction from an extension of the first surface to ends of the first and second electrode layers disposed on the first and second connection portions.

7. The multilayer electronic component of claim 6, wherein H2<T/2 is satisfied, in which T is an average size of the body in the first direction.

8. The multilayer electronic component of claim 2, wherein the first and second base electrode layers further include glass, and the first and second electrode layers further include glass and Pd.

9. The multilayer electronic component of claim 2, wherein 0.2≤B1/L≤0.4 and 0.2≤B2/L≤0.4 are satisfied, in which L is an average size of the body in the second direction, B1 is an average size in the second direction from an extension line of the third surface to an end of the first band portion, and B2 is an average size in the second direction from an extension line of the fourth surface to an end of the second band portion.

10. The multilayer electronic component of claim 9, further comprising:

an insulating layer disposed on the first surface and disposed between the first electrode layer and the second electrode layer.

11. The multilayer electronic component of claim 2, further comprising a first insulating layer disposed on the first connection portion and a second insulating layer disposed on the second connection portion.

12. The multilayer electronic component of claim 11, wherein the first and second insulating layers include an epoxy resin.

13. The multilayer electronic component of claim 1, wherein, if the first base electrode layer disposed on the third surface is referred to as a first connection electrode, the second base electrode layer disposed on the fourth surface is referred to as a second connection electrode, the first electrode layer disposed on the first surface and connected to the first connection electrode is referred to as a first band electrode, and the second electrode layer disposed on the first surface and connected to the second connection electrode is referred to as a second band electrode, the first and second connection electrodes include Cu, and the first and second band electrodes include Ag.

14. The multilayer electronic component of claim 13, wherein the first connection electrode includes a first connection portion disposed on the third surface and connected to the first internal electrode and a first corner portion extending from the first connection portion to a corner connecting the first surface and the third surface, the second connection electrode includes a second connection portion disposed on the fourth surface and connected to the second internal electrode and a second corner portion extending from the second connection portion to a corner connecting the first surface and the fourth surface, the first band electrode extends to cover at least a portion of the first corner portion, and the second band electrode extends to cover at least a portion of the second corner portion.

15. The multilayer electronic component of claim 14, wherein an average size of the first and second band electrodes from a lowest point in the first direction to a highest point in the first direction is 10 μm or more and 40 μm or less.

16. The multilayer electronic component of claim 13, wherein the first connection electrode includes a first connection portion disposed on the third surface and connected to the first internal electrode and a first corner portion extending from the first connection portion to a corner connecting the first surface and the third surface, the second connection electrode includes a second connection portion disposed on the fourth surface and connected to the second internal electrode and a second corner portion extending from the second connection portion to a corner connecting the first surface and the fourth surface, the first band electrode extends to cover at least a portion of the first connection portion, and the second band electrode extends to cover at least a portion of the second connection portion.

17. The multilayer electronic component of claim 16, wherein H1≥H2 is satisfied, in which H1 is an average size in the first direction from the first surface to an internal electrode disposed closest to the first surface among the first and second internal electrodes and H2 is an average size in the first direction from an extension line of the first surface to ends of the first and second band electrodes disposed on the first and second connection portions.

18. The multilayer electronic component of claim 16, wherein H1<H2 is satisfied, in which H1 is an average size in the first direction from the first surface to an internal electrode disposed closest to the first surface among the first and second internal electrodes and H2 is an average size in the first direction from an extension of the first surface to ends of the first and second band electrodes disposed on the first and second connection portions.

19. The multilayer electronic component of claim 18, wherein H2<T/2 is satisfied, in which T is an average size of the body in the first direction.

20. The multilayer electronic component of claim 13, wherein the first and second connection electrodes include glass, and
the first and second band electrodes include glass and Pd.

21. The multilayer electronic component of claim 13, wherein 0.2≤B1/L≤0.4 and 0.2≤B2/L≤0.4 are satisfied, in which L is an average size of the body in the second direction, B1 is an average size in the second direction from an extension line of the third surface to an end of the first band electrode, and B2 is an average size in the second direction from an extension line of the fourth surface to an end of the second band electrode.

22. The multilayer electronic component of claim 21, further comprising:
an insulating layer disposed on the first surface and disposed between the first band electrode and the second band electrode.

23. The multilayer electronic component of claim 13, further comprising a first insulating layer disposed on the first connection electrode and a second insulating layer disposed on the second connection electrode.

24. The multilayer electronic component of claim 23, wherein the first and second insulating layers include an epoxy resin.

25. The multilayer electronic component of claim 1, wherein the first base electrode layer further comprises a first band portion disposed to extend from the first connection portion to a portion of the first surface, and a third band portion disposed to extend from the first connection portion to a portion of the second surface,
the second base electrode layer further comprises a second band portion disposed to extend from the second connection portion to a portion of the first surface, and a fourth band portion disposed to extend from the second connection portion to a portion of the second surface,
the first electrode layer is disposed on the first connection portion,
the second electrode layer is disposed on the second connection portion,
a first metal frame is disposed on the first electrode layer,
a second metal frame is disposed on the second electrode layer, and
a conductive connection portion is disposed between the first electrode layer and the first metal frame and between the second electrode layer and the second metal frame, respectively.

26. The multilayer electronic component of claim 25, wherein the first electrode layer extending from the first connection portion to a portion on the first and third band portions, and the second electrode layer extends from the second connection portion to a portion on the second and fourth band portions.

27. The multilayer electronic component of claim 25, wherein the first electrode layer is spaced apart from ends of the first and third band portions, and
the second electrode layer is spaced apart from ends of the second and fourth band portions.

28. The multilayer electronic component of claim 25, wherein an average size in the second direction from an end of the first electrode layer to ends of the first and third band portions and an average size in the second direction from an end of the second electrode layer to ends of the second and fourth band portions are 0.1 μm or more and 0.58 μm or less.

29. The multilayer electronic component of claim 25, wherein the first and second electrode layers are disposed between an extension line of the first surface and an extension line of the second surface.

30. The multilayer electronic component of claim 25, wherein the conductive connection portions include Ag and an epoxy resin.

31. The multilayer electronic component of claim 25, wherein the first and second metal frames include at least one of Ni, Fe, Cu, Ag, Cr, and alloys thereof.

32. The multilayer electronic component of claim 25, wherein the first and second base electrode layers further include glass, and
the first and second electrode layers further include glass and Pd.

33. A multilayer electronic component, comprising:
a body including a dielectric layer and first and second internal electrodes with the dielectric layer therebetween in a stacking direction;
a first base electrode layer disposed on the body and connected to the first internal electrode through a surface of the body;
a second base electrode layer disposed on the body and connected to the second internal electrode through another surface of the body;
a first electrode layer connected to the first base electrode layer and covering only a portion of the first base electrode layer disposed on said surface of the body; and
a second electrode layer connected to the second base electrode layer and covering only a portion of the second base electrode layer disposed on said another surface of the body,
wherein the first and second base electrode layers include Cu, and the first and second electrode layers include Ag, and
wherein an outermost portion of at least one of the first base electrode layer or the second base electrode layer in a direction perpendicular to the stacking direction is outward of a portion of the first electrode layer disposed on the surface of the body or a portion of the second electrode layer disposed on the another surface of the body, respectively.

34. The multilayer electronic component of claim 33, wherein the body includes first and second surfaces opposing each other in a first direction, third and fourth surfaces, respectively corresponding to said surface and another surface, connected to the first and second surfaces and opposing each other in a second direction, and fifth and sixth surfaces connected to the first to fourth surfaces and opposing each other in a third direction, the first base electrode layer includes a first connection portion disposed on the third surface and connected to the first internal electrode, the second base electrode layer includes a second connection portion disposed on the fourth surface and connected to the second internal electrode, the first electrode layer is disposed on the first surface and extends onto the third surface to cover a portion of the first connection portion, and the second electrode layer is disposed on the first surface and extends onto the fourth surface to cover a portion of the second connection portion.

35. The multilayer electronic component of claim 34, wherein the first electrode layer and the second electrode layer are spaced apart from the second surface.

36. The multilayer electronic component of claim 34, wherein in the second direction, the first electrode layer at most covers a portion of the first and second internal electrodes and the second electrode layer at most covers a portion of the first and second internal electrodes.

37. The multilayer electronic component of claim 33, wherein the body includes first and second surfaces opposing each other in a first direction, third and fourth surfaces, respectively corresponding to said surface and another surface, connected to the first and second surfaces and opposing each other in a second direction, and fifth and sixth surfaces connected to the first to fourth surfaces and opposing each other in a third direction, the first base electrode layer includes a first connection portion disposed on the third surface and connected to the first internal electrode, the second base electrode layer includes a second connection portion disposed on the fourth surface and connected to the second internal electrode, the first electrode layer is disposed on the third surface to be in contact with the first connection portion and is spaced apart from ends of the first base electrode layer, and the second electrode layer is disposed on the fourth surface to be in contact with the second connection portion and is spaced apart from ends of the second base electrode layer.

38. The multilayer electronic component of claim 33, wherein the body includes first and second surfaces opposing each other in a first direction, third and fourth surfaces, respectively corresponding to said surface and another surface, connected to the first and second surfaces and opposing each other in a second direction, and fifth and sixth surfaces connected to the first to fourth surfaces and opposing each other in a third direction, the first base electrode layer includes a first connection portion disposed on the third surface and connected to the first internal electrode, the second base electrode layer includes a second connection portion disposed on the fourth surface and connected to the second internal electrode, the first electrode layer is disposed on the third surface and is spaced apart from the first surface and the second surface, and the second electrode layer is disposed on the fourth surface and is spaced apart from the first surface and the second surface.

39. The multilayer electronic component of claim 33, wherein the first and second base electrode layers further include glass, and the first and second electrode layers further include glass and Pd.

40. The multilayer electronic component of claim 33, wherein Cu is a main metal in the first and second base electrode layers, and Ag is a main metal in the first and second electrode layers.

41. A multilayer electronic component, comprising:
a body including a dielectric layer and first and second internal electrodes with the dielectric layer therebetween in a stacking direction;
a first base electrode layer disposed on the body and connected to the first internal electrode through a surface of the body;
a second base electrode layer disposed on the body and connected to the second internal electrode through another surface of the body;
a first electrode layer connected to the first base electrode layer and covering only a portion of the first base electrode layer disposed on said surface of the body; and
a second electrode layer connected to the second base electrode layer and covering only a portion of the second base electrode layer disposed on said another surface of the body,
wherein a main metal of the first and second electrode layers has a standard reduction potential greater than that of a main metal of the first and second base electrode layers, and
wherein an outermost portion of at least one of the first base electrode layer or the second base electrode layer in a direction perpendicular to the stacking direction is outward of a portion of the first electrode layer disposed on the surface of the body or a portion of the second electrode layer disposed on the another surface of the body, respectively.

42. The multilayer electronic component of claim 41, wherein the body includes first and second surfaces opposing each other in a first direction, third and fourth surfaces, respectively corresponding to said surface and another surface, connected to the first and second surfaces and opposing each other in a second direction, and fifth and sixth surfaces connected to the first to fourth surfaces and opposing each other in a third direction, the first base electrode layer includes a first connection portion disposed on the third surface and connected to the first internal electrode, the second base electrode layer includes a second connection portion disposed on the fourth surface and connected to the second internal electrode, the first electrode layer is disposed on the first surface and extends onto the third surface to cover a portion of the first connection portion, and the second electrode layer is disposed on the first surface and extends onto the fourth surface to cover a portion of the second connection portion.

43. The multilayer electronic component of claim 42, wherein the first electrode layer and the second electrode layer are spaced apart from the second surface.

44. The multilayer electronic component of claim 42 wherein in the second direction, the first electrode layer at most covers a portion of the first and second internal electrodes and the second electrode layer at most covers a portion of the first and second internal electrodes.

45. The multilayer electronic component of claim 41, wherein the body includes first and second surfaces opposing each other in a first direction, third and fourth surfaces, respectively corresponding to said surface and another surface, connected to the first and second surfaces and opposing each other in a second direction, and fifth and sixth surfaces connected to the first to fourth surfaces and opposing each other in a third direction, the first base electrode layer includes a first connection portion disposed on the third surface and connected to the first internal electrode, the second base electrode layer includes a second connection portion disposed on the fourth surface and connected to the second internal electrode, the first electrode layer is disposed on the third surface to be in contact with the first connection portion, and the second electrode layer is disposed on the fourth surface to be in contact with the second connection portion.

46. A multilayer electronic component, comprising:

a body including a dielectric layer, first and second internal electrodes, alternately disposed with the dielectric layer disposed therebetween, first and second surfaces opposing each other in a first direction, third and fourth surfaces connected to the first and second surfaces and opposing each other in a second direction, and fifth and sixth surfaces connected to the first to fourth surfaces and opposing each other in a third direction;

a first base electrode layer disposed on the third surface and including a first connection portion connected to the first internal electrode;

a second base electrode layer disposed on the fourth surface and including a second connection portion connected to the second internal electrode;

a first electrode layer disposed on a region including the third surface, the first surface, and the second surface, and formed to expose at least a portion of the first base electrode layer; and a second electrode layer disposed on a region including the fourth surface, the first surface, and the second surface and formed to expose at least a portion of the second base electrode layer, wherein the first and second base electrode layers include Cu, and the first and second electrode layers include Ag, wherein the first base electrode layer further comprises a first band portion disposed to extend from the first connection portion to a portion of the first surface, and a third band portion disposed to extend from the first connection portion to a portion of the second surface, wherein the second base electrode layer further comprises a second band portion disposed to extend from the second connection portion to a portion of the first surface, and a fourth band portion disposed to extend from the second connection portion to a portion of the second surface, wherein the first electrode layer is disposed on the first connection portion, wherein the second electrode layer is disposed on the second connection portion, wherein a first metal frame is disposed on the first electrode layer, wherein a second metal frame is disposed on the second electrode layer, wherein a conductive connection portion is disposed between the first electrode layer and the first metal frame and between the second electrode layer and the second metal frame, respectively, and wherein the first and second electrode layers are disposed between an extension line of the first surface and an extension line of the second surface.

* * * * *